US011193038B2

(12) United States Patent
Temel et al.

(10) Patent No.: US 11,193,038 B2
(45) Date of Patent: Dec. 7, 2021

(54) DRIER COMPOSITIONS FOR ALKYD RESINS

(71) Applicant: ALLNEX Austria GmbH, Werndorf (AT)

(72) Inventors: Armin Temel, Graz (AT); Thomas Schönbacher, Kalsdorf (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 191 days.

(21) Appl. No.: 16/315,269

(22) PCT Filed: Jul. 17, 2017

(86) PCT No.: PCT/EP2017/067994
§ 371 (c)(1),
(2) Date: Jan. 4, 2019

(87) PCT Pub. No.: WO2018/015333
PCT Pub. Date: Jan. 25, 2018

(65) Prior Publication Data
US 2019/0309185 A1 Oct. 10, 2019

(30) Foreign Application Priority Data
Jul. 19, 2016 (EP) .................................... 16180103

(51) Int. Cl.
C09D 167/08 (2006.01)
C09F 9/00 (2006.01)
C09D 7/65 (2018.01)
C09D 7/63 (2018.01)
C08K 5/00 (2006.01)
C08K 5/34 (2006.01)
C08L 71/02 (2006.01)

(52) U.S. Cl.
CPC .......... *C09D 167/08* (2013.01); *C08K 5/0091* (2013.01); *C08K 5/34* (2013.01); *C09D 7/63* (2018.01); *C09D 7/65* (2018.01); *C09F 9/00* (2013.01); *C08L 71/02* (2013.01)

(58) Field of Classification Search
CPC .......... C09D 167/08; C09D 7/63; C09D 7/65; C09F 9/00; C08L 71/02; C08L 67/08
See application file for complete search history.

(56) References Cited

U.S. PATENT DOCUMENTS

| 7,479,518 | B2 * | 1/2009 | Urbano | .................. | C08G 63/48 |
| | | | | | 524/500 |
| 2013/0274386 | A1 * | 10/2013 | Weijnen | ............... | C08K 5/3432 |
| | | | | | 524/92 |
| 2014/0342163 | A1 * | 11/2014 | Meijer | .................. | C08K 5/0091 |
| | | | | | 428/423.1 |

FOREIGN PATENT DOCUMENTS

| EP | 3037464 | 6/2016 |
| JP | 08-217915 | 8/1996 |
| RU | 2 572 965 | 1/2016 |
| RU | 2 589 481 | 7/2016 |
| WO | 2003/093384 | 11/2003 |
| WO | 2004/094546 | 11/2004 |
| WO | 2008/003652 | 1/2008 |
| WO | 2011/098584 | 8/2011 |
| WO | 2011/157673 | 12/2011 |
| WO | 2012/079624 | 6/2012 |
| WO | 2012/093250 | 7/2012 |
| WO | 2013/092441 | 6/2013 |
| WO | 2013/092442 | 6/2013 |
| WO | 2014/202954 | 12/2014 |
| WO | 2015/011430 | 1/2015 |
| WO | 2015/082553 | 6/2015 |
| WO | 2015/114349 | 8/2015 |

OTHER PUBLICATIONS

International Search Report dated Oct. 19, 2017 in International Application No. PCT/EP2017/067994.
Written Opinion of the International Searching Authority dated Oct. 19, 2017 in International Application No. PCT/EP2017/067994.

* cited by examiner

*Primary Examiner* — David M Brunsman
(74) *Attorney, Agent, or Firm* — Wenderoth, Lind & Ponack, L.L.P.

(57) ABSTRACT

The present invention relates to a drier composition (DC) for use in a coating composition preferably in an autoxidizable alkyd based coating composition (AC). The drier composition (DC) comprises: (a) At least one metal complex (MC) comprising: at least one metal salt (MS) comprising at least one metal cation (M) which is selected from the group consisting of iron (Fe) and manganese (Mn) and at least one anion (AN) and at least one nitrogen donor ligand (L) which is selected from the group comprising monodentate, bidentate, tridentate, pentadentate, and hexadentate nitrogen donor ligands, and (b) at least one non-ionic emulsifier (E). The present invention is further directed to an autoxizable alkyd based coating composition (AC) comprising said drier composition (DC), to the use of said autoxizable alkyd based coating composition (AC) and also to a substrate coated with said autoxizable alkyd based coating composition (AC).

18 Claims, No Drawings

DRIER COMPOSITIONS FOR ALKYD RESINS

This application is a 371 filing of PCT/EP2017/067994, filed Jul. 17, 2017.

TECHNICAL FIELD

The present invention generally relates to a drier composition for use in coating compositions preferably in an autoxidizable alkyd based coating composition. The present invention is further directed to an autoxidizable alkyd based coating composition comprising such drier composition, to the use of said autoxidizable alkyd based coating composition and also to a substrate coated with said autoxidizable alkyd based coating composition.

BACKGROUND ART

Autoxidizable curing or "drying" coating compositions such as paints and varnishes usually comprise resinous binders which are cured, i. e. crosslinked and thereby solidified, under the influence of the oxygen present in the air, or other oxidizing agents. This crosslinking process may be very slow, leading to extended curing times. It has therefore become usual to add compounds referred to as "driers" or "siccatives" which accelerate this crosslinking and curing process. According to the definition given in DIN EN 971-1 (1996) are these mostly metal salts of organic acids which are soluble in the solvents and binders which are usually used.

The most common driers are salts of transition metals which occur in at least two different oxydation states which are different from zero, which salts are also referred to as "primary driers" or "primary siccatives". These may also be used in combination with other metal salts which are not driers themselves, but may enhance the crosslinking effect of the driers mentioned hereinbefore, or may attenuate or reduce adverse effects of primary driers, and are commonly referred to as "secondary driers" or "secondary siccatives".

Examples of known drier salts include polyvalent salts containing cobalt, calcium, copper, zinc, iron, zirconium, manganese, barium, zinc, strontium, lithium and potassium as the cation; and halides, nitrates, sulphates, carboxylates, such as acetates, ethylhexanoates, octanoates and naphthenates, or acetoacetonates as the anion. The catalytic activity of the metal during decomposition of the (hydro)peroxide relies on the repeated transition of the metal ion from the lower to the higher oxidation state and back again, leading to reduction and oxidation of the hydroperoxides to catalyze and accelerate oxidation of the unsaturated oil component of the composition. For this reason, transition metals have more been commonly employed in such driers, as transition metals are capable of switching from a lower valence state to a higher valence state in a redox reaction with fatty acid peroxides present in the alkyd composition.

To date, driers based on cobalt have been most widely used because of their good performance at ambient temperature. However, because the cobalt salts will most likely be restricted in the near future because of regulatory issues, it is now desired to find alternative drier compounds that show at least comparable drying performance to that of cobalt driers and which can replace cobalt based driers completely in oxidatively air-drying coatings.

Driers based on non-cobalt (or cobalt-free) metal salts, and in particular on manganese (Mn) and on iron (Fe) have already been disclosed in prior art.

WO2013092442 and WO2013092441 describe a drier for autoxidizable coating compositions comprising a manganese salt complex which contains as a ligand 1,4,7-trialkyl-1,4,7-triazacyclononane. WO2013092442 and WO2013092441 disclose different possible molar ratio between the manganese salt and the ligand in the drier.

WO2014202954 discloses a drier comprising mononuclear or dinuclear manganese complexes which are prepared through a process involving a contacting step with an alkaline earth metal silicate.

WO2011098584 describes a manganese salt complex for coating compositions wherein the anion of the manganese catalyst is selected from the group consisting of $Cl^-$, $NO_3^-$, $R_2COO^-$ or $SO_4^{2-}$.

WO2003093384 discloses a drier for alkyd resins which comprises a transition metal salt and a reducing biomolecule. In particular, the metal salt may be iron or manganese among others.

WO2012079624 describes a drier composition which comprises a metal complex, wherein the metal is either iron or manganese, and at least one K-salt of organic acid.

Despite these numerous attempts, there is still a need to develop non-cobalt driers which show improved drying speed without a strong tendency for skin formation on paint storage, which do not increase the yellowing of the resulting coating, and which improve the hardness of the resulting coating.

Technical Problem

The present invention aims to provide a drier composition which is cobalt-free and which, when using in autoxidizable alkyd based coating compositions, allows accelerating the drying of the resulting composition, which has no significant impact or only a very limited impact on the yellowing and discoloration of the resulting coating and which improves the hardness of the resulting coating without affecting the other properties of said autoxidizable alkyd based coating compositions like for example the skin formation or the corrosion resistance.

GENERAL DESCRIPTION OF THE INVENTION

This object has been achieved by providing a drier composition (DC) according to the present invention which comprises:
(a) At least one metal complex (MC) comprising:
   at least one metal salt (MS) comprising at least one metal cation (M) which is selected from the group consisting of iron (Fe) and manganese (Mn) and at least one anion (AN) and
   at least one nitrogen donor ligand (L) which is selected from the group comprising monodentate, bidentate, tridentate, pentadentate, and hexadentate nitrogen donor ligands, and
(b) At least one non-ionic emulsifier (E)
and optionally the molar ratio between the at least one metal cation (M) and the at least one nitrogen donor ligand (L) is comprised within the range of from 0.05 to 20, preferably from 0.1 to 10, more preferably from 0.5 to 2 and most preferably is 1.

Indeed, it has been surprisingly found that the use of a non-ionic emulsifier (E) in combination with at least one metal complex (MC), in particular iron or manganese complex, allows achieving effective drying for autoxidizable alkyd based coating compositions (AC). This effect is achieved for both solvent-borne and water-borne coating compositions. Preferably, the drier composition (DC) according to the invention is cobalt-free.

Furthermore, the addition of a non-ionic emulsifier (E) in combination with at least one metal complex (MC) surprisingly leads to the improvement of the hardness of the autoxidizable alkyd based coating compositions (AC) containing said drier composition (DC). Furthermore, limited yellowing of the autoxidizable alkyd based coating compositions (AC) is caused.

In addition, the use of a non-ionic emulsifier (E) allows reducing the skin formation which may occur when storing autoxidizable alkyd based coating compositions (AC), in particular for the solvent-borne type compositions.

On the other hand, the addition of a non-ionic emulsifier (E), although hydrophilic, does not affect the corrosion resistance of the autoxidizable alkyd based coating compositions (AC), especially for the water-borne type compositions. It has been observed that a better gloss is obtained when using the non-ionic emulsifier (E), especially in water-borne coating compositions. Moreover, the incorporation of the drier composition (DC) is easier in water-borne coating compositions when comprising the non-ionic emulsifier (E).

According to one embodiment, the drier composition (DC) may optionally comprise at least one solvent (S), which can be preferably selected from the group consisting of: white spirit, glycols or glycol ethers, alcohols, water and any mixture thereof.

Another aspect of the invention is to provide a drier composition (DC) which comprises:
(a) At least one metal complex (MC) comprising:
at least one metal salt (MS) comprising at least one metal cation (M) which is selected from the group consisting of iron (Fe) and manganese (Mn) and at least one anion (AN) and
at least one nitrogen donor ligand (L) which is selected from the group comprising monodentate, bidentate, tridentate, pentadentate, and hexadentate nitrogen donor ligands,
(b) At least one non-ionic emulsifier (E), and
(c) At least one co-ligand (CL), which is preferably 2,2'-bipyridyl and/or a tricarbamoyl triazine compound,
and optionally the molar ratio between the at least one metal cation (M) and the at least one nitrogen donor ligand (L) is comprised within the range of from 0.05 to 20, preferably from 0.1 to 10, more preferably from 0.5 to 2 and most preferably is 1.

Indeed, it has been found that the addition of at least one co-ligand (CL) like 2,2-bipyridyl and/or a tricarbamoyl triazine compound further improves the performance of the drier composition (DC) in particular with regards to the yellowing, the hardness obtained and the low-skinning tendency of the autoxidizable alkyd based coating compositions (AC).

Another aspect of the invention concerns the use of said drier composition (DC) for drying autoxidizable alkyd based coating composition (AC).

Another aspect of the invention is an autoxidizable alkyd based coating composition (AC) comprising:
(1) At least one drier composition (DC) comprising:
(a) At least one metal complex (MC) comprising:
at least one metal salt (MS) comprising at least one metal cation (M) which is selected from the group consisting of iron (Fe) and manganese (Mn) and at least one anion (AN) and
at least one nitrogen donor ligand (L) which is selected from the group comprising monodentate, bidentate, tridentate, pentadentate, and hexadentate nitrogen donor ligands,
(b) At least one non-ionic emulsifier (E), and
(c) Optionally at least one co-ligand (CL), which is preferably 2,2'-bipyridyl and/or a tricarbamoyl triazine compound,
and
(2) at least one autoxidizable alkyd binder (AB).

Another aspect of the invention refers to the use of said autoxidizable alkyd based coating composition (AC) in a varnish, a lacquer, a paint, a stain, an enamel, a printing ink, floor covering or any similar products.

Another aspect of the invention relates to a substrate which is coated with said autoxidizable alkyd based coating composition (AC).

Another aspect of the invention also concerns the preparation process of the drier composition (DC) which comprises the step of:
Admixing:
(a) at least one metal complex (MC) comprising:
at least one metal salt (MS) comprising at least one metal cation (M) which is selected from the group consisting of iron (Fe) and manganese (Mn) and at least one anion (AN) and
at least one nitrogen donor ligand (L) which is selected from the group comprising monodentate, bidentate, tridentate, pentadentate, and hexadentate nitrogen donor ligands,
and (b) at least one non-ionic emulsifier (E),
and with optionally (c) at least one co-ligand (CL), which is preferably 2,2'-bipyridyl and/or a tricarbamoyl triazine compound.

DESCRIPTION OF PREFERRED EMBODIMENTS

The present invention proposes a drier composition (DC) which comprises:
(a) at least one metal complex (MC) comprising:
at least one metal salt (MS) comprising at least one metal cation (M) which is selected from the group consisting of iron (Fe) and manganese (Mn) and at least one anion (AN) and
at least one nitrogen donor ligand (L) which is selected from the group comprising monodentate, bidentate, tridentate, pentadentate, and hexadentate nitrogen donor ligands, and
(b) At least one non-ionic emulsifier (E).

The term "drier" is used herein for a metal complex (MC) which comprises a metal salt (MS) and which acts as a catalyst for the auto-oxidation reaction which is initiated on drying, it will be recognized that the terms "siccative", "dessicator" or dessicative" are used as synonyms for driers in this art. The drier composition (DC) refers to a mixture of at least one drier, which is at least one metal complex (MC) and at least one non-ionic emulsifier (E) as presently claimed. The drier composition (DC) according to the invention is useful for drying autoxidizable alkyd based coating compositions (AC) which comprises at least one autoxidizable alkyd binder (AB).

The term "autoxidizable alkyd binder" (AB) (the term autoxidizable alkyd resin" may be synonymously used) includes any type of polymers which comprises unsaturated aliphatic groups, most typically unsaturated fatty acid residues. These unsaturated aliphatic groups or unsaturated fatty acid residues ensure the air drying properties but do not preclude the binder from comprising either saturated fatty acid residues or other functional groups. Generally, the unsaturated fatty acid residue is a carboxylic acid with $C_{12}$ to $C_{20}$ carbon atom chain.

The term "autoxidizable alkyd based coating composition" (AC) refers to compositions comprising a drier composition (DC) as presently claimed and at least one autoxidizable alkyd binder (AB).

Drier Composition (DC):

Metal Complex (MC):

When developing the present invention, it has been found that the combination of a metal complex (MC) with a non-ionic emulsifier (E) allows accelerating the drying speed of autoxidizable alkyd based coating composition (AC), obtaining a low yellowness and improving the hardness of the resulting coatings.

The at least one metal complex (MC) comprises at least one metal salt (MS) comprising at least one metal cation (M) and at least one anion (AN) and at least one nitrogen donor ligand (L), wherein the metal cation (M) is selected from the group consisting of Fe and Mn and wherein said at least one nitrogen donor ligand (L) is selected from the group comprising monodentate, bidentate, tridentate, pentadentate, and hexadentate nitrogen donor ligands.

According to one embodiment, the at least one metal complex (MC) is a Fe or Mn complex of a polydentate nitrogen donor ligand (L) and more preferably: bidentate, tridentate, tetradentate, pentadenate or hexadentate nitrogen donor ligand (L). Polydentate means that the ligand (L) contains multiple donor atoms available for coordination with Mn or Fe.

The metal salt (MS) comprises a metal cation (M) which is selected from the group consisting of Fe and Mn and can be in different oxidation states, preferably different from 0.

According to one embodiment the metal cation (M) is an iron cation which may be preferably selected from Fe(II) and Fe(III) or a manganese cation which may be preferably selected from Mn(II), Mn(III) and Mn(IV).

According to a preferred embodiment, the at least one anion (AN) may be selected from the group consisting of: halides, nitrates ($NO_3^-$), sulphates ($SO_4^{2-}$), carboxylates ($COO^-$), $PF_6^-$, $SbF_6^-$, $AsF_6^-$, $BF_4^-$, $B(C_6F_6)_4^-$, $Cl^-$, $Br^-$, $I^-$, $NO_3^-$, or $RCOO^-$, wherein R is $C_1$-$C_{20}$ alkyl. Examples of carboxylates may be acetates, ethylhexanoates, octanoates, neodecanoates, naphthenates, and acetoacetonates.

Preferably, the anion (AN) is a neodecanoate.

The molar amount of the at least one anion (AN) is chosen in order to compensate the oxidation state of the metal (M) in the metal salt (MS).

The metal salt (MS) may also optionally comprise at least one solvent (S), which can be preferably selected from the group consisting of: white spirit, glycols or glycol ethers, alcohols, water and any mixture thereof. The at least one solvent (S) may be added directly to the metal salt (MS) and/or to the drier composition (DC). In case the at least one solvent (S) is added to the metal salt (MS) and to the drier composition (DC), the at least one solvent (S) may be the same or different.

According to one embodiment, the metal salt (MS) is $Mn^{2+}$ (neodecanoate)$_2$.

The nitrogen donor ligand (L) is an organic structure or molecule which will support coordinating nitrogen atoms.

The metal complex (MC) may preferably be selected from the group consisting of [$MnLCl_2$], [$FeLCl_2$], [$FeLCl$]Cl; [$FeL(H_2O)$]($PF_6$)$_2$:[$FeL$]Cl$_2$, [$FeLCl$]$PF_6$, [$FeL(H_2O)(BF_4)_2$] and any mixtures thereof.

According to one embodiment, the metal complex (MC) is an iron or a manganese complex which comprises a tridentate, tetradentate or pentadentate nitrogen ligand (L). The iron complex may comprise preferably a pentadentate nitrogen donor ligand (L) and the manganese complex may preferably comprise a tridentate or a tetradentate nitrogen donor ligand (L).

The metal complex (MC) may preferably be a manganese of iron complex of tridentate, tetradentate, pentadentate or hexadentate nitrogen donor ligands, N-heterocyclic compounds and N-hetero-aromatics.

According to one embodiment, the molar ratio between the at least one metal cation (M) and the at least one nitrogen donor ligand (L) is comprised within the range of from 0.05 to 20, preferably from 0.1 to 10, more preferably from 0.5 to 2 and most preferably is 1. Preferably, the molar ratio between the at least one metal cation (M) and the at least one nitrogen donor ligand (L) may be 1:1. According to one embodiment, it is preferable to have a molar excess of the at least one nitrogen donor ligand (L) compared to the at least one metal cation (M).

According to one embodiment, the at least one nitrogen donor ligand (L) is selected from the group consisting of ligands of formula (I), (II), and more particularly of formulas (III) and (IV).

Nitrogen Donor Ligand (L):

Formula (I)

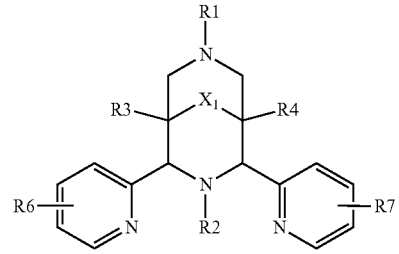

wherein $R^1$ and $R^2$ are independently selected from the group consisting of $C_{1-24}$alkyl, $C_{6-10}$aryl, heteroaryl, heteroaryl$C_{1-6}$alkyl, and —$CH_2$—$CH_2$—$N(CH_3)_2$, wherein heteroaryl is selected from the group consisting of pyridyl, pyrazinyl, pyrazolyl, pyrrolyl, imidazolyl, benzimidazolyl, pyrimidinyl, triazolyl and thiazolyl;

$R^3$ and $R^4$ are independently selected from the group consisting of —H, $C_{1-8}$alkyl, $C_{1-8}$alkyl-O—$C_{1-8}$alkyl, $C_{1-8}$alkyl-O—$C_{6-10}$aryl, $C_{6-10}$aryl, $C_{1-8}$-hydroxyalkyl, and —$(CH_2)_m C(O)OR_5$;

$R^5$ is selected from —H or $C_{1-4}$alkyl, m is an integer selected from 0 to 4;

each $R^6$ and $R^7$ are independently selected from the group consisting of —H, —F, —Cl, —Br, —OH, $C_{1-4}$alkoxy, —NH—C(O)—H, —NH—C(O)—$C_{1-4}$alkyl, —$NH_2$, —NH—$C_{1-4}$alkyl, and $C_{1-4}$alkyl;

$X^1$ is selected from —C(O)— or —$[C(R^8)_2]_n$— wherein n is an integer selected from 0 to 3, and each $R^8$ is independently selected from the group consisting of —H, —OH, $C_{1-4}$alkoxy and $C_{1-4}$alkyl;

Preferably $R^3$ and $R^4$ are selected from —C(O)—O—$CH_3$, —C(O)—O—$CH_2$—$CH_3$, —C(O)—O—$CH_2$—$C_6H_5$ and $CH_2OH$.

Preferably the heteroatom capable of coordinating to a transition metal is pyridine-2-ylmethyl optionally substituted by $C_{1-4}$alkyl.

Preferably $X^1$ is C=O.

Preferred groups for $R^1$ and $R^2$ are $CH_3$, $—C_2H_5$, $—C_3H_7$, benzyl, $—C_4H_9$, $—C_6H_{13}$, $—C_8H_{17}$, $—C_{12}H_{25}$, and $—C_{18}H_{37}$, $—CH_2$-pyridyl, and pyridin-2-yl. A preferred class of bispidon is one in which at least one of $R^1$ or $R^2$ is pyridin-2-ylmethyl or benzyl, preferably pyridin-2-ylmethyl. More preferably, $R^1$ is pyridin-2-ylmethyl and $R^2$ is methyl.

According to one embodiment, the bispidon may be dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-Cl) and the iron complex thereof FeN2py3o-Cl. Other preferred bispidons are those in which instead of having a methyl group at the 3 position have longer alkyl chains, namely isobutyl, (n-hexyl) $C_6$, (n-octyl) $C_8$, (n-dodecyl) $C_{12}$, (n-tetradecyl) $C_{14}$, (n-octadecyl) $C_{18}$, which were prepared in an analogous manner.

Formula (II):

The ligand (L) of formula (II) may also be referred as TACN or TACN-Nx compounds. TACN-Nx compounds comprises the basic 1,4,7-triazacyclononane structure but have one or more pendent nitrogen groups that complex with the metal to provide a tetradentate, pentadentate, or hexadentate ligand. Preferably the ligand (L) of formula (II) is TACN compounds.

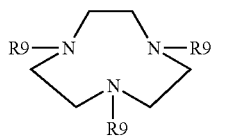

(II)

wherein each $R^9$ is independently selected from the group consisting of $C_{1-20}$alkyl, $C_{3-8}$cycloalkyl, heterocycloalkyl, heteroaryl, $C_{6-20}$aryl and $C_{6-10}$aryl-$C_{1-6}$alkyl, optionally substituted with a substituent selected from the group consisting of —OH, $C_{1-6}$alkoxy, phenoxy, carboxylate, carboxamide, carboxylic ester, sulfonate, amine, $C_{1-6}$alkylamine, one or more heteroatoms and $—N^+(R^{10})_3$;

each $R^{10}$ is selected from —H, $C_{1-6}$alkyl, $C_{2-6}$alkenyl, $C_{6-10}$aryl-$C_{1-6}$alkyl, $C_{6-10}$aryl-$C_{2-6}$alkenyl, $C_{1-6}$alkyloxy, $C_{2-6}$alkenyloxy, amino$C_{1-6}$alkyl, amino$C_{2-6}$alkenyl, $C_{1-6}$alkyl ether, $C_{2-6}$alkenyl ether, and $—CX^2_2—R^{11}$;

each $X_2$ is independently selected from —H or $C_{1-3}$alkyl and wherein each $R^{10}$ is independently selected from an optionally substituted heteroaryl group selected from the group consisting of pyridyl, pyrazinyl, pyrazolyl, pyrrolyl, imidazolyl, benzimidazolyl, pyrimidinyl, triazolyl and thiazolyl; and, wherein at least one of $R^{10}$ is $—CX^2_2—R^{11}$.

Preferably $R^{11}$ is selected from optionally substituted pyridin-2-yl, imidazol-4-yl, pyrazol-1-yl, quinolin-2-yl groups. Most preferably $R^{11}$ is either a pyridin-2-yl or a quinolin-2-yl.

According to one embodiment, the ligand (L) is of formula (II) in which $R^9$ is $C_{1-6}$alkyl optionally substituted with one or more heteroatoms, or $C_6-C_{10}$aryl optionally substituted with one or more heteroatoms.

Preferably, the ligand (L) of formula (II) is the one wherein $R^9$ is methyl such that specifically the ligand (L) is 1,4,7-trimethyl-1,4,7-triazacyclononane (TMTACN).

According to another specific embodiment, one of the $R^9$ group is linked to the nitrogen atom of another ring of another ligand of formula (II) via a bridge. Where a bridge is present in the ligands (L) of formula (II), this may be a $C_2$-$C_8$ alkylene bridge. The $C_2$-$C_8$ alkylene bridge may be straight $C_2$-$C_8$ alkylene chains, branched $C_2$-$C_8$ alkylene chains or cyclic $C_2$-$C_8$ alkylene group.

Where the bridge is a $C_6$-$C_{10}$ arylene bridge, this may be, for example, phenylene or the corresponding arylene formed by abstraction of two hydrogen atoms from naphthalene. Where the bridge comprises one or two $C_1$-$C_3$ alkylene units and one $C_6$-$C_{10}$ arylene unit, such bridges may be, for example, $—CH_2C_6H_4CH_2—$ or $—CH_2C_6H_4—$. It will be understood that each of these bridges may be optionally substituted one or more times, for example once, with independently selected $C_1$-$C_{24}$alkyl (e.g. $C_1$-$C_{18}$alkyl) groups.

In the ligands of formula (II), the bridge is typically a $C_2$-$C_6$ alkylene bridge. Where this is so, the bridge is typically a straight chain alkylene, e.g. is ethylene, n-propylene, n-butylene, n-pentylene or n-hexylene. According to particular embodiments, the $C_2$-$C_6$ alkylene bridge is ethylene or n-propylene. According to still more particular embodiments, the $C_2$-$C_6$ alkylene bridge is ethylene. Herein, references to propylene are intended to refer to n-propylene (i.e. $—CH_2CH_2CH_2—$, rather than $—CH(CH_3)CH_2—$) unless the context expressly indicates to the contrary.

According to one embodiment, the ligand (L) is of formula (I) or of formula (II).

Other Possible Ligands:

According to one embodiment, the ligand (L) may be "N4py type ligand", preferably in the form of iron metal complex. In this case, the ligand (L) is preferably selected from the group consisting of: N,N-bis(pyridin-2-yl-methyl)-bis(pyridin-2-yl) methylamine and N,N-bis(pyridin-2-yl-methyl-1,1-bis (pyridin-2-yl)-1-aminoethane.

According to another embodiment, the ligand (L) may be a cyclam type ligand and may be preferably selected from the group consisting of: 1,4,8,11-tetraazacyclotetradecane (cyclam), 1,4,8,11-tetramethyl-1,4,8,11-tetraazacyclotetradecane(Me4cyclam), 1,4,7,10-tetraazacyclododecane (cyclen), 1,4,7,10-tetramethyl-1,4,7,10-tetraazacyclododecane (Me4cyclen), and 1,4,7,10-tetrakis (pyridine-2ylmethyl)-1,4,7,10-tetraazacyclododecane (Py4cyclen).

According to a specific embodiment, the ligand (L) may be 5,12-dimethyl-1,5,8,12-tetraaza-bicyclo[6.6.2]hexadecane.

Alternatively, the nitrogen donor ligand (L) may be a "trispicen type" ligand and may be preferably selected from the group consisting of: N-methyl-tris(pyridin-2-ylmethyl) ethylene-1,2-diamine; N-octyl-tris(pyridin-2-ylmethyl)ethylene-1,2-diamine; N-octadecyl-tris(pyridin-2-ylmethyl) ethylene-1,2-diamine; N-methyl-N,N',N'-tris(3-methyl-pyridin-2-ylmethyl) ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris (5-methyl-pyridin-2-ylmethyl) ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-butyl-N,N',N'-tris(pyridin-2-ylmethyl) ethylene-1,2-diamine; N-octyl-N,N',N'-tris(pyridin-2-ylmethyl)ethylene-1,2-diamine; N-dodecyl-N,N',N'-tris (pyridin-2-ylmethyl)ethylene-1,2-diamine; N-octadecyl-N,N',N'-tris (pyridin-2-ylmethyl) ethylene-1,2-diamine; N-Methyl-N,N',N'-Tris (imidazol-2ylmethyl)-ethylenediamine; N-ethyl-N,N',N'-Tris (imidazol-2ylmethyl)-ethylenediamine; N,N'-dimethyl-N,N'-bis (imidazol-2-ylmethyl)-ethylenediamine; N-(1-propan-2-ol)-N,N',N'-Tris(imidazol-2ylmethyl)-ethylenediamine; N-(1-propan-2-ol)-N,N',N'-Tris(1-methyl-imidazol-2ylmethyl)-ethylenediamine; N,N-diethyl-N',N'',N''-Tris(5-methyl-imidazol-4ylmethyl)-diethylenetriamine; N-(3-propan-1-ol)-N,N',N'-Tris(1-methyl-imidazol-2-ylmethyl)-ethylenediamine; N-hexyl-N,N',N'-Tris(imidazol-2ylmethyl)-ethylenediamine; N-methyl-N,N',N'-tris (benzimidazol-2ylmethyl)-ethylenediamine; and, N-(3-propan-1-ol)methyl-N,N',N'-tris(benzimidazol-2ylmethyl)-ethylenediamine. The trispicens are preferably in the form of an iron metal complex.

Formula (III) and Formula (IV):

According to one embodiment, the nitrogen donor ligand (L) is selected from the group consisting of the compounds of formula (III) or (IV):

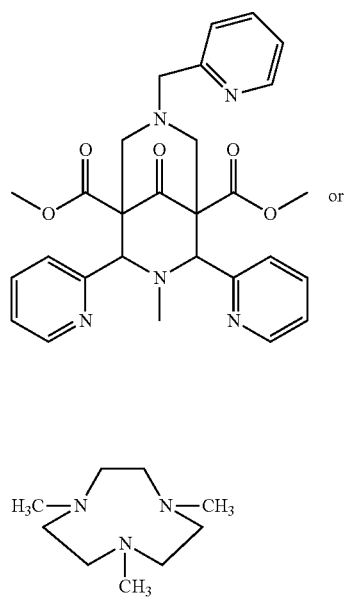

Formula (IV) corresponds to TMTACN.

Examples of Metal Complexes (MC):

According to one embodiment, the metal complex (MC) may comprise manganese as a metal cation (M) and at least one nitrogen donor ligand (L) of formula (I).

Alternatively, the metal complex (MC) may comprise manganese as a metal cation (M) and at least one nitrogen donor ligand (L) of formula (II).

According to one embodiment, the metal complex (MC) may comprise iron as a metal cation (M) and at least one nitrogen donor ligand (L) of formula (I).

Alternatively, the metal complex (MC) may comprise iron as a metal cation (M) and at least one nitrogen donor ligand (L) of formula (II).

According to one embodiment, the metal complex (MC) may comprise manganese as a metal cation (M) and at least one nitrogen donor ligand (L) of formula (III).

According to one specific embodiment, the metal complex (MC) may comprise a metal salt (MS) which comprises at least one metal cation (M) which is manganese and at least one nitrogen donor ligand (L) of formula (IV). According to one preferred embodiment, the metal complex (MC) may comprise a metal salt (MS) which comprises at least one metal cation (M) which is manganese, at least one nitrogen donor ligand (L) of formula (IV) and the molar ratio between the at least one metal cation (M) and the at least one nitrogen donor ligand (L) may be preferably comprised within the range of from 0.05 to 20, preferably from 0.1 to 10, more preferably from 0.5 to 2 and most preferably is 1. More specifically, the metal complex (MC) may comprise a metal salt (MS) which comprises at least one metal cation (M) which is manganese, at least one anion (AN) which is a carboxylate, preferably a neodecanoate, at least one nitrogen donor ligand (L) of formula (IV) and optionally the molar ratio between the at least one metal cation (M) and the at least one nitrogen donor ligand (L) may be preferably comprised within the range of from 0.05 to 20, preferably from 0.1 to 10, more preferably from 0.5 to 2 and most preferably is 1.

The metal complex (MC) may comprise iron as a metal cation (M) and at least one nitrogen donor ligand (L) of formula (III).

Alternatively, the metal complex (MC) may comprise iron as a metal cation (M) and at least one nitrogen donor ligand (L) of formula (IV).

According to the invention, a mixture of at least two or more of the previously described metal complexes (MC) may be used.

According to one embodiment, the examples of the metal complexes (MC) as above described may comprise as the anion (AN): halides, nitrates ($NO_3$), sulphates ($SO_4^{2-}$), carboxylates, $PF_6^-$, $SbF_6^-$, $AsF_6^-$, $BF_4^-$, $B(C_6F_5)_4^-$, $Cl^-$, $Br^-$, $I^-$, $NO_3^-$, or $RCOO^-$, wherein R is $C_1$-$C_{20}$ alkyl. Examples of carboxylates may be acetates, ethylhexanoates, octanoates, neodecanoates, naphthenates, and acetoacetonates. Preferably, the anion (AN) is a carboxylate and more preferably the anion (AN) is a neodecanoate.

Formula (V):

According to a specific embodiment, the metal complex (MC) is an iron complex of formula (V):

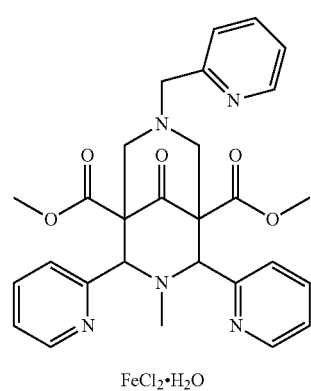

$FeCl_2 \cdot H_2O$

The iron complex of formula (V) is also referred as the active ingredient of Borchi® Oxy Coat from OMG Borchers with CAS number 478945-46-9.

Formula (VI):

According to one embodiment, the metal complex (MC) is a manganese complex of formula (VI):

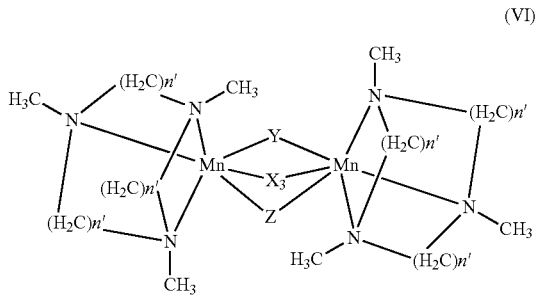

(VI)

$X_3$, Y and Z are identical or different from each other and selected from the group consisting of $CH_3$—$COO^-$ or $CH_3$—$(CH_2)_3$—$CH(CH_3CH_2)COO^-$ and n' is an integer in a range between 1 and 4, preferably between 2 and 4, and more preferably between 2 and 3.

The manganese complex of formula (VI) is also referred as the active ingredient of Nuodex Drycoat® commercially available from Huntsman Pigments & Additives (CAS number [1381939-25-8]).

According to one embodiment, the metal complex (MC) comprises a metal salt (MS) which comprises Manganese (Mn) as at least one metal cation (M) and neodecanoate as at least one anion (AN) and TACN ligand, preferably TMTACN ligand, as at least one nitrogen donor ligand (L) and optionally the molar ratio between Mn and TACN ligand, preferably TMTACN ligand, is comprised within the range of from 0.05 to 20, preferably from 0.1 to 10 and more preferably from 0.5 to 2 and most preferably is 1.

Non-Ionic Emulsifier (E):

The drier composition (DC) according to the present invention also comprises at least one non-ionic emulsifier (E). The at least one non-ionic emulsifier (E) is preferably an alkoxylated compound.

Indeed, it has been found by the inventors that the addition of at least one non-ionic emulsifier (E) in combination with at least one metal complex (MC) in a drier composition (DC) improves the properties of the drier composition (DC).

The use of a non-ionic emulsifier (E) allows accelerating the drying speed of the autoxidizable alkyd based coating composition (AC) and increasing the hardness of the resulting coating.

Furthermore, the use of a non-ionic emulsifier (E) allows reducing the skin formation which may occur when storing autoxidizable alkyd based coating compositions (AC), in particular for the solvent-borne type compositions.

Regarding the water-borne coating compositions, it has been surprisingly found that the addition of a non-ionic emulsifier (E), does not affect the corrosion resistance of the autoxidizable alkyd based coating compositions (AC). In addition, a better gloss is obtained when using the non-ionic emulsifier (E) in water-borne coating compositions. Moreover, the incorporation of the drier is easier in water-borne coating compositions when comprising the non-ionic emulsifier (E).

According to one embodiment the non-ionic emulsifier (E) is the reaction product of at least one alkylene oxide and a least one compound (C) selected from the group consisting of: $C_6$ to $C_{14}$ alkyl phenols, branched primary alcohols, $C_8$ to $C_{25}$ fatty alcohols, $C_8$ to $C_{25}$ fatty acids, $C_8$ to $C_{25}$ fatty amines and any mixtures thereof. The at least one alkylene oxide is preferably selected from the group consisting of: ethylene oxide, propylene oxide and any mixtures thereof.

Preferably, the at least one compound (C) is selected from the group consisting of: $C_8$ to $C_{12}$ alkyl phenols, $C_{12}$ to $C_{18}$ fatty alcohols, $C_{12}$ to $C_{18}$ fatty acids, branched primary alcohols and $C_{12}$ to $C_{18}$ fatty amines. More preferably, the at least one compound (C) is a $C_{12}$ to $C_{18}$ fatty acid selected from the group consisting of: oleic acid, mono oleic acid, myristoleic acid, palmitoleic acid, sapienic acid, elaidic acid, vaccenic acid, ninoleic acid, linolelaidic acid, and α-linolenic acid.

The at least one non-ionic emulsifier (E) comprises from 3 to 50 alkylene oxide units. Preferably, the at least one non-ionic emulsifier (E) comprises from 4 to 15 alkylene oxide units, more preferably from 5 to 12 alkylene oxide units and most preferably from 5 to 8 alkylene oxide units.

Preferably the alkylene oxide units may comprise from 2 to 5 carbon atoms and is more preferably selected from the group consisting of: ethylene oxide, propylene oxide and any mixtures thereof.

According to one embodiment, the at least one non-ionic emulsifier (E) is selected from the group consisting of: $C_{12}$ to $C_{18}$ fatty acid alkoxylates, $C_{12}$ to $C_{18}$ fatty alcohol alkoxylates, branched primary alcohol alkoxylates and $C_8$ to $C_{12}$ alkyl phenol alkoxylates.

Preferably the at least one non-ionic emulsifier (E) is selected from the group consisting of: $C_{12}$ to $C_{18}$ fatty acid ethoxylates, $C_{12}$ to $C_{18}$ fatty alcohol ethoxylates, branched primary alcohol ethoxylates and $C_8$ to $C_{12}$ alkyl phenol ethoxylates which are preferably liquid at room temperature, most preferably oleic acid ethoxylate with from 6 to 8 ethylene oxide units.

According to one specific embodiment, the at least one non-ionic emulsifier (E) may be a branched primary alcohol alkoxylates of formula (VII):

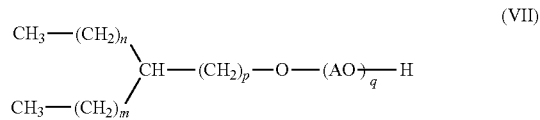

(VII)

where n and m are each independently from 1 to 13; and p is 1 or 2; such that n+m+p is preferably from 5 to 15; AO is an alkylene oxide unit having from 2 to 4 carbon atoms; and q is from 3 to 50.

The alkylene oxide units AO in formula (VII) are preferably ethylene oxide and/or propylene oxide units. Preferably, all the alkylene oxide units AO in formula (VII) are ethylene oxide units although mixtures of ethylene oxide and propylene oxide units, particularly preferably with a molar ratio of ethylene oxide to propylene oxide units from 1:5 to 10:1, can be used. When mixed alkylene oxide units AO in formula (VII) are used, the polyoxyalkylene chain can be a random or a block copolymeric chain. Within the range of from 5 to 50, q is preferably from 10 to 30. The number of oxyalkylene units in the polyoxyalkylene chain, q, is an average value and may be non-integral. The alkoxylates of the formula (VII) can be used alone or in combination with alkoxylates of linear primary alcohols.

According to a specific embodiment, the non-ionic emulsifier (E) may be an alkoxylated resin (B) which has an acid number of from 0.2 mg/g to 5 mg/g.

The alkoxylated resin (B) may be preferably a condensation product of:
an alkyd resin (Ba) and
an adduct (Bb) of:
a hydroxyl group containing monoalkyl ether (Bb1) selected from the group consisting of:
$C_1$- to $C_4$-monoalkyl ethers (Bb11) of a polyoxyethylene glycol,
$C_1$- to $C_4$-monoalkyl ethers (Bb12) of a mixed ether of ethylene and propylene glycol, and any mixtures thereof,
and an anhydride (Bb2) of a cycloaliphatic dicarboxylic acid.

In particular, the alkyd resin (Ba) may preferably be made by co-condensation of one or more polyols (Ba1) having two or more hydroxyl groups per molecule, one or more polybasic acids (Ba2) and one or more fatty acids (Ba3) which may be replaced or mixed with one or more triglyceride oils (Ba4).

Optionally the alkyd resin (Ba) may also contain one or more monobasic acids (Ba5). Preferably, at least one of the fatty acids (Ba3) has at least one olefinic unsaturation per molecule. Preferably, at least one of the triglyceride oils (Ba4) comprises at least one residue derived from a fatty acid having at least one olefinic unsaturation in its molecule.

According to one embodiment, the alkoxylated resin (B) may be the reaction product of:

The polyols (Ba1) which may be aliphatic linear or branched-chain hydroxyl compounds having from two to six hydroxyl groups per molecule, preferably up to four hydroxyl groups per molecule, such as ethylene glycol, 1,2- and 1,3-propylene glycol, 1,2- and 1,4-butanediol, glycerol, trimethylol propane, trimethylol ethane, erythritol, threitol, pentaerythritol, ditrimethylol propane, ditrimethylol ethane, sorbitol and mannitol.

The polybasic acids (Ba2) which may be aliphatic linear, branched or cyclic, or aromatic, having from two to four acid groups, and preferably from 3 to 20 carbon atoms, and may preferably be selected from the group consisting of phthalic acid, trimellithic acid, tetrahydrophthalic acid, adipic acid, malonic acid, cyclohexane dicarboxylic acid, isophthalic or terephthalic acid, and benzophenone tetracarboxylic acid. Alternatively the corresponding anhydrides of polybasic acids can be used.

The fatty acids (Ba3) which may be preferably at least monoolefinically unsaturated aliphatic monocarboxylic acids having preferably from 4 to 24 carbon atoms. Preferred are lauroleic, myristoleic, palmitoleic, oleic, gadolic, erucic, ricinoleic, linoleic, and linolenic acids as well as mixtures of these, particularly the naturally occurring mixtures such as soy bean oil fatty acid, linseed oil fatty acid, sunflower oil fatty acid, safflower oil fatty acid, rubber seed oil fatty acid, and tall oil fatty acid and juvandol fatty acid.

The triglyceride oils (Ba4) which may be oils preferably having an iodine number of from 120 cg/g to 200 cg/g, particularly preferably soy bean oil, linseed oil, sunflower oil, safflower oil, rubber seed oil, and tall oil.

The monobasic acid (Ba5) which may be preferably aromatic monocarboxylic acids such as benzoic acid or alkyl-substituted benzoic acids, cycloaliphatic monocarboxylic acids, in particular the so called resin acids, aliphatic branched carboxylic acids, such as isononanoic acid, 2-ethylhexanoic acid, or ®Versatic acid, a mixture of alpha-branched decanoic acids.

Preferably, the alkyd resins (Ba) have an acid number of less than 5 mg/g, particularly preferred from 0.1 mg/g to 4 mg/g, and especially preferred from 0.2 mg/g to 3.5 mg/g.

Their hydroxyl number is preferably from 30 mg/g to 100 mg/g, particularly preferred from 40 mg/g to 90 mg/g, and especially preferred from 60 mg/g to 85 mg/g.

The adduct (Bb) is the reaction product of:
a hydroxyl group-containing monoalkyl ether (Bb1) selected from the group consisting of:
$C_1$- to $C_4$-monoalkyl ethers (Bb11) of a polyoxyethylene glycol,
$C_1$- to $C_4$-monoalkyl ethers (Bb12) of a mixed ether of ethylene and propylene glycol, and any mixtures thereof,
and an anhydride (Bb2) of a cycloaliphatic dicarboxylic acid.

The adduct (Bb) preferably has an acid number of from 5 mg/g to 60 mg/g, particularly preferred of from 10 mg/g to 45 mg/g, and especially preferred, of from 15 mg/g to 40 mg/g.

The $C_1$- to $C_4$-monoalkyl ethers (Bb11) of a polyoxyethylene glycol are preferably methyl, ethyl, n-propyl and n-butyl monoethers of polyethylene glycol, wherein the polyethylene glycol has a weight average molar mass of preferably from 500 g/mol to 4000 g/mol, particularly preferred from 750 g/mol to 3000 g/mol. The average number of hydroxyl groups per molecule is preferably from 0.8 to 1.2, particularly preferred from 0.9 to 1.1. Especially preferred are polyethylene glycols partially etherified with methanol, and having a molar mass of from 1000 g/mol to 2000 g/mol.

The $C_1$- to $C_4$-monoalkyl ether (Bb12) of a mixed ether of ethylene and propylene glycol are preferably methyl, ethyl, n-propyl and n-butyl monoethers of a mixed ether of ethylene and 1,2-propylene glycols, wherein the mass fraction of oxyethylene groups is from 10% to 85%, and the mass fraction of oxypropylene groups is from 90% to 15%, calculated as the ratio of the mass of oxyalkylene groups having two or three carbon atoms, respectively, and the sum of the masses of all oxyalkylene groups in the mixed ether (Bb12), and have a mass average molar mass of preferably from 500 g/mol to 10 000 g/mol, particularly preferred from 1000 g/mol to 8000 g/mol. The average number of hydroxyl groups per molecule is preferably from 0.8 to 1.2, particularly preferred from 0.9 to 1.1.

The anhydride (Bb2) of a cycloaliphatic dicarboxylic acid can preferably have from 8 to 12 carbon atoms and is preferably selected from the group consisting of tetrahydrophthalic anhydride, hexahydrophthalic anhydride, and their homologues such as methyl-tetra-hydro-phthalic anhydride or butyl tetrahydrophthalic anhydride.

Examples of suitable alkoxylated resins (B) are the reaction products of:
At least one polyol (Ba1) which is preferably glycerol, pentaerythritol and/or sorbitol,
At least one polybasic acid (Ba2) which is preferably phthalic acid anhydride,
At least one fatty acid (Ba3) which is preferably juvandol fatty acid,
At least one monobasic acid (Ba5) which is preferably benzoic acid,
At least one hydroxyl group-containing monoalkyl ether (Bb1) which is preferably a monomethyl ether of polyethylene glycol with an average molar mass between 500 and 4000 and
At least one anhydride (Bb2) of a cycloaliphatic dicarboxylic acid which is preferably tetrahydro phthalic acid anhydride.

Most preferably the non-ionic emulsifier (E) is liquid and non-crystallizing at temperatures superior to 5° C.

The drier composition (DC) may preferably comprise from 1 wt. % to 99 wt. % of at least one metal complex (MC) and preferably from 2 wt. % to 40 wt. % and more preferably from 5 wt. % to 15 wt. % compared to the total weight of the drier composition (DC). In this case, the metal complex (MC) does not comprise any solvent.

The drier composition (DC) may preferably comprise from 99 wt. % to 1 wt. % of at least one non-ionic emulsifier (E) and more preferably from 95 wt. % to 50 wt. % and most preferably 90 wt. % to 60 wt. % compared to the total weight of the drier composition (DC).

According to one embodiment, when the non-ionic emulsifier (E) is an alkoxylated resin (B), the drier composition (DC) may preferably comprise from 99 wt. % to 1 wt. % of the at least one alkoxylated resin (B) and most preferably from 90 wt. % to 60 wt. % compared to the total weight of the drier composition (DC).

Also any mixtures of non-ionic emulsifiers (E) can be used. The mixtures of non-ionic emulsifiers (E) may preferably include at least one alkoxylated resin (B) in addition to at least one alkoxylated compound which is not an alkoxylated resin (B). According to one embodiment, the at least one non-ionic emulsifier (E) may be a mixture of at least one reaction product of at least one alkylene oxide and at least one compound (C) selected from the group consisting of: $C_6$ to $C_{14}$ alkyl phenols, $C_8$ to $C_{25}$ fatty alcohols, branched primary alcohols, $C_8$ to $C_{25}$ fatty acids, $C_8$ to $C_{25}$ fatty amines and at least one alkoxylated resin (B).

Optionally the drier composition (DC) may also comprise at least one solvent (S), which can be preferably selected from the group consisting of: white spirit, glycols or glycol ethers, alcohols, water and any mixture thereof. The solvent (S) content may be in the range of 0.1 to 30 wt. % compared to the total weight of the drier composition (DC).

According to one embodiment, the drier composition (DC) may preferably comprise:
 (a) At least one metal complex (MC) comprising:
  at least one metal salt (MS) comprising at least one metal cation (M) which is manganese (Mn) and at least one anion (AN), which may preferably be neodecanoate and
  at least one nitrogen donor ligand (L) which is of formula (IV) and
 (b) At least one non-ionic emulsifier (E),
and optionally the molar ratio between Mn and the nitrogen donor ligand (L) of formula (IV), may be comprised within the range of from 0.05 to 20, preferably from 0.1 to 10, more preferably from 0.5 to 2 and most preferably is 1.

Alternatively, the drier composition (DC) may preferably comprise:
 (a) At least one metal complex (MC) comprising:
  at least one metal salt (MS) comprising at least one metal cation (M) which is manganese (Mn) and at least one anion (AN), which may preferably be neodecanoate and
  at least one nitrogen donor ligand (L) which is of formula (IV) and
 (b) At least one non-ionic emulsifier (E) which is an oleic acid ethoxylate with from 6 to 8 ethylene oxide units,
and optionally the molar ratio between Mn and the nitrogen donor ligand (L) of formula (IV), may be comprised within the range of from 0.05 to 20, preferably from 0.1 to 10, more preferably from 0.5 to 2 and most preferably is 1.

The drier composition (DC) may preferably comprise:
 (a) At least one iron complex of formula (V) or at least one manganese complex of formula (VI), and
 (b) At least one oleic acid ethoxylate with from 6 to 8 ethylene oxide units.

Alternatively, the drier composition (DC) may preferably comprise:
 (a) At least one metal complex (MC) comprising:
  at least one metal salt (MS) comprising at least one metal cation (M) which is manganese (Mn) and at least one anion (AN), which may preferably be neodecanoate and
  at least one nitrogen donor ligand (L) which is of formula (IV) and
 (b) At least one non-ionic emulsifier (E) which is an alkoxylated resin (B),
and optionally the molar ratio between Mn and the nitrogen donor ligand (L) of formula (IV), may be comprised within the range of from 0.05 to 20, preferably from 0.1 to 10, more preferably from 0.5 to 2 and most preferably is 1.

The drier composition (DC) may preferably comprise:
 (a) At least one iron complex of formula (V) or at least one manganese complex of formula (VI), and
 (b) At least one alkoxylated resin (B) which is the reaction product of:
  At least one polyol (Ba1) which is preferably glycerol, pentaerythritol and/or sorbitol,
  At least one polybasic acid (Ba2) which is preferably phthalic acid anhydride,
  At least one fatty acid (Ba3) which is preferably juvandol fatty acid,
  At least one monobasic acid (Ba5) which is preferably benzoic acid,
  At least one hydroxyl group-containing monoalkyl ether (Bb1) which is preferably a monomethyl ether of polyethylene glycol with an average molar mass between 500 and 4000 and
  At least one anhydride (Bb2) of a cycloaliphatic dicarboxylic acid which is preferably tetrahydro phthalic acid anhydride.

According to one specific embodiment, the drier composition (DC) comprises from 1 wt. % to 99 wt. % of at least one metal complex (MC) and from 99 wt % to 1 wt. % of at least one non-ionic emulsifier (E) compared to the total weight of the drier composition (DC) and the sum of wt. % of the at least one metal complex (MC) and the at least one non-ionic emulsifier (E) is 100 wt %.

According to one specific embodiment, the drier composition (DC) may comprise from 5 wt. % to 40 wt. % of at least one metal complex (MC) and from 60 wt. % to 95 wt. % of at least one non-ionic emulsifier (E) and alternatively from 5 wt % to 35 wt % of at least one metal complex (MC) and from 65 wt % to 95 wt % of at least one non-ionic emulsifier (E) compared to the total weight of the drier composition (DC) and the sum of wt. % of the at least one metal complex (MC) and the at least one non-ionic emulsifier (E) is 100 wt %.

According to one specific embodiment, when the non-ionic emulsifier (E) is an alkoxylated resin (B), the drier composition (DC) may comprise from 5 wt. % to 40 wt. % of at least one metal complex (MC) and from 60 wt. % to 95 wt. % of the at least one alkoxylated resin (B) compared to the total weight of the drier composition (DC) and the sum of wt. % of the at least one metal complex (MC) and the at least one non-ionic emulsifier (E) is 100 wt %.

Also any mixtures of non-ionic emulsifier (E) are possible. The mixtures of non-ionic emulsifier (E) may include one or more alkoxylated resin (B). The mixtures of non-ionic emulsifiers (E) may preferably include at least one alkoxylated resin (B) in addition to at least one alkoxylated compound which is not an alkoxylated resin (B).

Optionally the drier composition (DC) may also comprise at least one solvent (S), which can be preferably selected from the group consisting of: white spirit, glycols or glycol ethers, alcohols, water and any mixture thereof. The total solvent content can be in the range of 0.1 to 30 wt. % compared to the total weight of the drier composition (DC).

According to another embodiment, the drier composition (DC) comprises at least one metal complex (MC), at least one non-ionic emulsifier (E) and at least one solvent (S) and the sum of the wt. % of the at least one metal complex (MC), the at least one non-ionic emulsifier (E) and the at least one solvent (S) compared to the total weight of the drier composition (DC) is 100%.

Alternatively, the drier composition (DC) comprises at least one metal complex (MC) from 5 wt. % to 15 wt. %, at least one solvent (S) from 0 wt. % to 20 wt. % and at least one non-ionic emulsifier (E) from 95 wt. % to 65 wt. % and the sum of the wt. % of the at least one metal complex (MC), the at least one solvent (S) and the at least one non-ionic emulsifier (E) compared to the total weight of the drier composition (DC) is 100%.

Co-Ligand (CL)

According to one embodiment, the drier composition (DC) may further comprise: —(c) a co-ligand (CL).

Preferably, this co-ligand (CL) is: 2,2'-bipyridyl and/or a tricarbamoyl triazine compound.

It has been found that the addition of at least one co-ligand (CL) like 2,2-bipyridyl and/or a tricarbamoyl triazine compound provides several advantages. Indeed, it improves the performance of the drier composition (DC) in particular with regards to the yellowing, the hardness obtained and the low-skinning tendency of the resulting autoxidizable alkyd based coating compositions (AC). Thus, coatings with significant improved properties are obtained by combining at least one co-ligand (CL), preferably, 2,2'-bipyridyl and/or a tricarbamoyl triazine compound with at least one metal complex (MC) and at least one non-ionic emulsifier (E).

Preferably the tricarbamoyl triazine compound may be of formula (VIII):

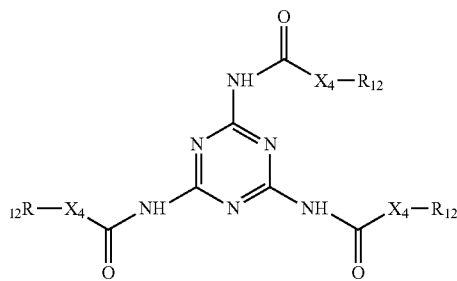

Formula (VIII)

Wherein $R_{12}$ is $C_1$-$C_8$ alkyl or phenyl and X4 is oxygen. Alternatively, the tricarbamoyl triazine compound may be an oligomer of carbamoyl triazine of formula (VIII) wherein $R_{12}$ is $C_1$-$C_8$ lower alkyl or phenyl and $X_4$ is oxygen. Preferably, the tricarbamoyl triazine compound is Trisalkoxy carbamoyl triazine (TACT). TACT is available from Allnex under the commercial names Cymel® NF 2000.

According to one embodiment, $R_{12}$ is selected from the group consisting of: methyl, ethyl, n-propyl, butyl, i-propyl, n-octyl, 2-ethylhexyl, phenyl or a mixture of any of the foregoing.

The drier composition (DC) may preferably comprise:
(a) At least one metal complex (MC) comprising
at least one metal salt (MS) comprising at least one metal cation (M) which is selected from the group consisting of iron (Fe) and manganese (Mn) and at least one anion (AN) and
at least one nitrogen donor ligand (L) which is selected from the group comprising monodentate, bidentate, tridentate, pentadentate, and hexadentate nitrogen donor ligands,
(b) At least one non-ionic emulsifier (E), and
(c) At least one co-ligand (CL), which is preferably 2,2'-bipyridyl and/or a tricarbamoyl triazine compound, and optionally the molar ratio between the at least one metal cation (M) and the at least one nitrogen donor ligand (L) may be preferably comprised within the range of from 0.05 to 20, preferably from 0.1 to 10, more preferably from 0.5 to 2 and most preferably is 1. Optionally, the drier composition (DC) may also comprise at least one solvent (S) which can be preferably selected from the group consisting of white spirit, glycols or glycol ethers, alcohols, water and any mixture thereof.

Alternatively, the drier composition (DC) may preferably comprise:
(a) At least one metal complex (MC) comprising:
at least one metal salt (MS) comprising at least one metal cation (M) which is manganese (Mn) and at least one anion (AN), which may preferably be neodecanoate and
at least one nitrogen donor ligand (L) which is of formula (IV)
(b) At least one non-ionic emulsifier (E), and
(c) At least one co-ligand (CL), which is preferably 2,2'-bipyridyl and/or a tricarbamoyl triazine compound, and optionally the molar ratio between Mn and the nitrogen donor ligand (L) of formula (IV), may be comprised within the range of from 0.05 to 20, preferably from 0.1 to 10, more preferably from 0.5 to 2 and most preferably is 1.

According to one embodiment, the drier composition (DC) may preferably comprise:
(a) At least one metal complex (MC) comprising:
at least one metal salt (MS) comprising at least one metal cation (M) which is manganese (Mn) and at least one anion (AN), which may be preferably neodecanoate and
at least one nitrogen donor ligand (L) which is of formula (IV)
(b) At least one non-ionic emulsifier (E) which is an oleic acid ethoxylate with from 6 to 8 ethylene oxide units, and
(c) At least one co-ligand (CL), which is preferably 2,2'-bipyridyl and/or a tricarbamoyl triazine compound, and optionally the molar ratio between Mn and the nitrogen donor ligand (L) of formula (IV), may be comprised within the range of from 0.05 to 20, preferably from 0.1 to 10, more preferably from 0.5 to 2 and most preferably is 1.

According to one embodiment of the invention, the drier composition (DC) may preferably comprise:
(a) At least one iron complex of formula (V) or at least one manganese complex of formula (VI),
(b) At least one oleic acid ethoxylate with from 6 to 8 ethylene oxide units, and (c) At least one co-ligand (CL), which is preferably 2,2'-bipyridyl and/or a tricarbamoyl triazine compound, Alternatively, the drier composition (DC) may preferably comprise:
(a) At least one metal complex (MC) comprising:
at least one metal salt (MS) comprising at least one metal cation (M) which is manganese (Mn) and at least one anion (AN), which may be preferably neodecanoate and
at least one nitrogen donor ligand (L) which is of formula (IV)
(b) At least one non-ionic emulsifier (E) which is an alkoxylated resin (B), and
(c) At least one co-ligand (CL), which is preferably 2,2'-bipyridyl and/or a tricarbamoyl triazine compound, and optionally the molar ratio between Mn and the nitrogen donor ligand (L) of formula (IV), may be comprised within the range of from 0.05 to 20, preferably from 0.1 to 10, more preferably from 0.5 to 2 and most preferably is 1.

According to one specific embodiment of the invention, the drier composition (DC) may preferably comprise:
(a) At least one iron complex of formula (V) or at least one manganese complex of formula (VI),
(b) At least one alkoxylated resin (B) which is the reaction product of:
At least one polyol (Ba1) which is preferably glycerol, pentaerythritol and/or sorbitol,
At least one polybasic acid (Ba2) which is preferably phthalic acid anhydride,
At least one fatty acid (Ba3) which is preferably juvandol fatty acid,
At least one monobasic acid (Ba5) which is preferably benzoic acid,
At least one hydroxyl group-containing monoalkyl ether (Bb1) which is preferably a monomethyl ether of polyethylene glycol with an average molar mass between 500 and 4000 and
At least one anhydride (Bb2) of a cycloaliphatic dicarboxylic acid which is preferably tetrahydro phthalic acid anhydride, and
(c) At least one co-ligand (CL), which is preferably 2,2'-bipyridyl and/or a tricarbamoyl triazine compound.

Alternatively, the drier composition (DC) comprises at least one metal cation (M) which is manganese, at least one nitrogen donor ligand (L) which is of formula (IV):

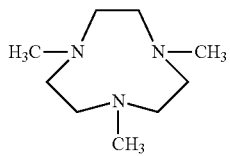

(IV)

and at least one non-ionic emulsifier (E) is an oleic acid ethoxylate with from 6 to 8 ethylene oxide units and/or an alkoxylated resin (B) which is the reaction product of:
At least one polyol (Ba1) which is preferably glycerol, pentaerythritol and/or sorbitol,
At least one polybasic acid (Ba2) which is preferably phthalic acid anhydride,
At least one fatty acid (Ba3) which is preferably juvandol fatty acid,
At least one monobasic acid (Ba5) which is preferably benzoic acid,
At least one hydroxyl group-containing monoalkyl ether (Bb1) which is preferably a monomethyl ether of polyethylene glycol with an average molar mass between 500 and 4000 and
At least one anhydride (Bb2) of a cycloaliphatic dicarboxylic acid which is preferably tetrahydro phthalic acid anhydride, and and optionally may further comprise a co-ligand (CL) which is preferably 2,2'bipyridyl and/or a tricarbamoyl triazine compound.

The drier composition (DC) may preferably comprise from 0.05 wt % to 20 wt % of at least one co-ligand (CL) which is preferably 2,2'-bipyridyl, more preferably from 0.1 wt. % to 10 wt. %, and most preferably from 1 wt. % to 5 wt. % compared to the total weight of the drier composition (DC).

The drier composition (DC) may preferably comprise from 0.5 wt % to 20 wt % of at least one co-ligand (CL) which is preferably a tricarbamoyl triazine compound, more preferably from 2 wt. % to 15 wt. %, and most preferably from 5 wt. % to 10 wt. % compared to the total weight of the drier composition (DC).

According to one specific embodiment, the drier composition (DC) comprises at least one metal complex (MC), at least one non-ionic emulsifier (E) and at least one co-ligand (CL) which is 2,2'-bipyridyl and/or a tricarbamoyl triazine compound and the sum of the wt. % of the at least one metal complex (MC), the at least one non-ionic emulsifier (E) and the at least one co-ligand (CL) compared to the total weight of the drier composition (DC) is 100%.

According to another embodiment, the drier composition (DC) comprises at least one metal complex (MC), at least one non-ionic emulsifier (E), at least one co-ligand (CL) which is 2,2'-bipyridyl and/or a tricarbamoyl triazine compound and at least one solvent (S) and the sum of the wt. % of the at least one metal complex (MC), the at least one non-ionic emulsifier (E), the at least one co-ligand (CL) and the at least one solvent (S) compared to the total weight of the drier composition (DC) is 100%.

Alternatively, the drier composition (DC) comprises at least one metal complex (MC) from 5 wt. % to 15 wt. %, at least one solvent (S) from 0 wt. % to 20 wt. %, at least one co-ligand (CL) from 5 wt. % to 15 wt. % and at least one non-ionic emulsifier (E) from 90 wt. % to 50 wt. % and the sum of the wt. % of the at least one metal complex (MC), the at least one solvent (S), the at least one co-ligand (CL) and the at least one non-ionic emulsifier (E) compared to the total weight of the drier composition (DC) is 100%.

Preparation Process of the Drier Composition (DC):

The present invention also refers to the preparation process of the drier composition (DC) which comprises the step of:
Admixing:
(a) At least one metal complex (MC) comprising:
at least one metal salt (MS) comprising at least one metal cation (M) which is selected from the group consisting of iron (Fe) and manganese (Mn) and at least one anion (AN) and
at least one nitrogen donor ligand (L) which is selected from the group comprising monodentate, bidentate, tridentate, pentadentate, and hexadentate nitrogen donor ligands, and
(b) At least one non-ionic emulsifier (E), and optionally with at least one co-ligand (CL), which is preferably 2,2'-bipyridyl and/or the tricarbamoyl triazine compound. At least one solvent (S) may optionally be admixed as well.

Autoxidizable Alkyd Based Coating Composition (AC)

The present invention also refers to an autoxidizable alkyd based coating composition (AC) comprising the drier composition (DC) and at least one autoxidizable alkyd binder (AB).

According to one embodiment, the autoxidizable alkyd based coating composition (AC) comprises the drier composition (DC) and at least one autoxidizable alkyd binder (AB), wherein the autoxidizable alkyd binder (AB) does not comprise the at least one non-ionic emulsifier (E) before being mixed with the drier composition (DC).

The autoxidizable alkyd coating composition (AC) may optionally comprise an additional emulsifier which is different from the at least one non-ionic emulsifier (E).

According to one embodiment, the autoxidizable alkyd coating composition (AC) does not comprise any further emulsifier.

According to one embodiment, the autoxidizable alkyd based coating composition (AC) comprises an amount of drier composition (DC) from 0.01 wt. % to 5 wt. % and more preferably from 0.1 wt. % to 3 wt. % compared to the total weight of the autoxidizable alkyd based coating composition (AC).

The autoxidizable alkyd based coating composition (AC) may preferably comprise an amount of solid autoxidizable alkyd binder (AB) from 10 wt. % to 90 wt. % and more preferably from 25 wt. % to 75 wt. % compared to the total weight of the autoxidizable alkyd based coating composition (AC).

The autoxidizable alkyd based coating composition (AC) may preferably comprise from 1 ppm to 500 ppm of metal cation (M), and more preferably from 10 ppm to 300 ppm of metal cation (M) of said metal complex (MC) compared to the total weight of the autoxidizable alkyd based coating composition (AC).

The mass fraction of the metal cation (M) in the autoxidizable alkyd based coating composition (AC) may be preferably of from 1 ppm to 500 ppm and more preferably from 10 ppm to 300 ppm based on the mass of the solids of the autoxidizable alkyd binder(s) (AB).

The autoxidizable alkyd based coating composition (AC) may preferably comprise a liquid medium that is a low viscosity solvent such as water, organic (co-) solvents and mixtures thereof. The autoxidizable alkyd based coating composition (AC) may be a water-borne or a solvent-borne coating composition.

When the autoxidizable alkyd based coating composition (AC) is a solvent-borne coating composition, the following suitable solvents may be used, for instance: aromatic solvent such as toluene or xylene, as well as aliphatic solvents such as ethyl diglycol, ethyl glycol acetate, butyl glycol, butyl glycol acetate, butyl diglycol, butyldiglycol acetate and methoxypropylene glycol acetate. Commercially available solvent are for instance Shellsoll® D40 (from Shell), Shellsoll® D60 (from Shell), Dowanol® PMA from Dow, and Solvesso®150, available from Exxonmobil.

The autoxidizable alkyd based coating composition (AC) comprises at least one autoxidizable alkyd binder (AB). The term "autoxidizable alkyd binder" and "autoxidizable alkyd resin" may be used interchangeably.

The autoxidizable alkyd binders (AB) useful for the invention are usually the reaction product of the esterification of polyhydric alcohols with polybasic acids (or their anhydrides) and unsaturated fatty acids (or glycerol esters thereof), for example derived from linseed oil, tung oil, tall oil as well as for other drying or semi-drying oils.

Suitable drying unsaturated fatty acids, semi-drying fatty acids or mixture thereof, useful herein for providing the fatty acid groups in the resin include ethylenically unsaturated conjugated or non-conjugated carboxylic acids, such as myristoleic, palmitoleic, arachidonic, erucic, gadoleic, clupanadonic, oleic, ricinoleic, linoleic, linolenic, licanic, nisinic acid and eleostearic acids or mixture thereof, typically used in the form of mixtures of fatty acids derived from natural or synthetic oils. Suitable unsaturated fatty acids for providing fatty acid groups in the resin also include fatty acids derived from soybean oil, conjugated soybean oil, palm oil, linseed oil, tung oil, rapeseed oil, sunflower oil, conjugated sunflower oil, calendula oil, wood oil, tallow oil, (dehydrated) castor oil, safflower oil, tuna fish oil, coconut oil and dehydrated coconut oil, and combinations thereof.

The number average molecular weight (Mn) of the autoxidizable alkyd binder (AB) will generally be above 150, more usually higher than 1,000 and most typically higher than 5,000. For reasons of viscosity, the number average molecular weight (Mn) should generally be below 120,000, and more usually below 80,000.

The term autoxidizable alkyd binders (AB) is also meant to include modified alkyds for specific applications, such as silicon-based alkyds, thixotropic alkyds and, most importantly, urethane-modified alkyds. As such, the autoxidizable alkyd binder (AB) may be based on pure polyester resin (not having urethane and/or amide groups), polyesteramide resin, urethanised polyester resin, urethanised polyesteramide resin and mixtures thereof.

Examples of suitable divalent polyol compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Optionally, use is made of compounds having 3-12 carbon atoms, e.g., glycerol, pentaerythritol and/or dipentaerythritol.

Alternatively or additionally, polycarboxylic acids can be used as building blocks for the autoxidizable alkyd binder. Examples of suitable polycarboxylic acids include phthalic acid, citric acid, fumaric acid, mesaconic acid, maleic acid, citraconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetra-carboxylic acid, endoisopropylidene-cyclohexane-1,2-dicarboxylic acid, cyclo-hexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1-4 carbon atoms.

At least a part of the autoxidizable alkyd binder (AB) is oxidatively crosslinkable as a result of the incorporation of unsaturated, aliphatic compounds as described above. Fatty acids containing conjugated double bonds, such as dehydrated castor oil fatty acid, wood oil fatty acid and/or calendula oil fatty acid, may be mentioned specifically. Fatty acids derived from soya oil are especially suitable.

The unsaturated groups in the autoxidizable alkyd binder (AB) can be introduced by the fatty acids, but may, alternatively or additionally, be introduced by one or more of the polyols, carboxylic acids or anhydrides or other building blocks used, such as fatty mono-alcohols. The autoxidizable alkyd binder (AB) can for instance have pendant groups in an amount of more than 20%, e.g., more than 50%, or more than 65% by weight of the autoxidizable alkyd binder (AB).

Optionally, the autoxidizable alkyd binder (AB) may comprise other building blocks, which can for example be derived from monocarboxylic acids such as pivalic acid, 2-ethylhexanoic acid, lauric acid, palmitic acid, stearic acid, 4-tert. butyl-benzoic acid, cyclopentane carboxylic acid, naphthenic acid, cyclohexane carboxylic acid, 2,4-dimethyl benzoic acid, 2-methyl benzoic acid, benzoic acid, 2,2-dimethylol propionic acid, tetrahydrobenzoic acid, and hydrogenated or non-hydrogenated abietic acid or its isomer. If so desired, the monocarboxylic acids in question may be used wholly or in part as triglyceride, e.g, as vegetable oil, in the preparation of the alkyd resin. If so desired, mixtures of two or more of such monocarboxylic acids or triglycerides may be employed.

Optionally, isocyanates may also be used as building blocks for the autoxidizable alkyd binder. Suitable isocyanates include diisocyanates, such as 1,6-hexane diisocyanate, isophorone diisocyanate, toluene diisocyanate, diphenyl diisocyanate, and dicyclo-hexylmethane diisocyanate, and triisocyanates.

The autoxidizable alkyd binder (AB) can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the polyols and, optionally, other building blocks will then give the final alkyd resin. This transesterification generally takes place at a temperature of from 115 to 250° C., optionally with solvents such as toluene and/or xylene also present. The reaction generally is carried out in the presence of a catalytic amount of a transesterification catalyst. Examples of suitable transesterification catalysts include acids, such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

The autoxidizable alkyd binders (AB) are often characterized by their oil length. Oil length is defined as the weight percentage of fatty acid building blocks (calculated as their triglycerides) in the autoxidizable alkyd binders (AB). The drier composition (DC) according to the present invention can be used with autoxidizable alkyd binders (AB) of any oil length, namely:

Long oil lengths which show a percentage of triglycerides of 55% or higher,
Medium oil length alkyds which show a percentage of triglycerides of between 40 and 55%,
Short oil length alkyds which show a percentage of triglycerides of less than 40%.

According to one embodiment, the autoxidizable alkyd binder (AB) is a medium or long oil unmodified alkyd, a silicone modified alkyd, a polyurethane modified alkyd, an acrylic modified alkyd or any mixture thereof.

According to one embodiment, the autoxidizable alkyd binder (AB) is a solvent borne alkyd or a water borne alkyd resin. Examples of autoxidizable alkyd binder (AB) may be Vialkyd® AS673/60SD60 (commercially available from Allnex®), or Resydrol® AY6150w/45WA (commercially available from Allnex®).

The water borne alkyd resin can be externally or internally emulsified, whereas externally means that the alkyd resin is dispersed in water by means of an emulsifier or surfactant and internally means that the alkyd resin itself carries hydrophilic groups that make it compatible with water. In particular, the water-based alkyd resins described in patent applications WO2015101585, WO2004094546, WO2005012376 are included within the scope of the invention.

The autoxidizable alkyd based coating compositions (AC) that comprise drier composition (DC) according to the present invention may also contain one or more of the usual additives such as anti-skinning agents, anti-settling agents, antioxidants, levelling agents, viscosity modifiers, light or UV stabilizers, co-solvents, dispersants, surfactants, inhibitors, fillers, anti-static agents, flame-retardant agents, lubricants, anti-foaming agents, extenders, plasticizers, anti-freezing agents, waxes, thickeners, thixotropic agents pigments, wetting agents, emulsifiers, flow modifiers, corrosion protection additives, compatibilizing solvents, and coalescing agents.

The autoxidizable alkyd based coating composition (AC) according to the invention can be used as a clear varnish or may contain pigments. Pigments can ordinarily include opacifying pigments, such as titanium dioxide, zinc oxide, leaded zinc oxide, or tinting pigments, such as carbon black, yellow oxides, brown oxides, tan oxides, raw and burnt sienna or umber, chromium oxide green, phthalocyanine green, phthalonitrile blue, ultramarine blue, cadmium pigments or chromium pigments.

One may underline that the autoxidizable alkyd based coating compositions (AC) according to the invention may comprise any kind of pigments even those resulting in very light hues (like white or beige) since the use of the drier composition (DC) will have no significant effect on yellowing or on discoloration.

Where present the fillers are preferably selected from the group consisting of such as clay, silica, talc, or mica.

When used the anti-oxidants and anti-skinning agents are preferably selected from the group consisting of methylethylketoxime, acetonoxime, butyraldoxime, dialkylhydroxylamine, cyclohexanoneoxime or mixtures thereof. In this case, the concentration of antioxidant or anti-skinning compound applied is preferably in a range of from 0.001 to 2 wt. %, by weight of the autoxidizable alkyd based coating composition (AC).

According to one specific embodiment, the autoxidizable alkyd based coating composition (AC) may optionally comprise, in addition to the drier composition (DC), at least one additional drier (AD) which may be a primary drier and/or a secondary drier.

The at least one additional drier (AD) may be a primary drier selected from the group consisting of cobalt (Co), cerium (Ce), lead (Pb), iron (Fe), manganese (Mn), vanadium (V), copper (Cu) carboxylates and any mixtures thereof.

The at least one additional drier (AD) may be a secondary drier selected from the group consisting of: calcium (Ca), barium (Ba), potassium (K), lithium (Li) metal soaps, zirconium (Zr), strontium (Sr), aluminium (Al), bismuth (Bi), lanthanum (La), neodymium (Nd), and any mixtures thereof. In particular, carboxylate compounds of these metals may be used.

According to one embodiment, the additional drier (AD) may be selected from the group consisting of: Cobalt (Co), Iron (Fe), Manganese (Mn), Copper (Cu), cerium (Ce), Calcium (Ca), zirconium (Zr), Aluminium (Al), Strontium (Sr), barium (Ba), lithium (Li), zinc (Zn) and any mixtures thereof.

Preferably, the additional drier (AD) is a secondary drier.

The autoxidizable alkyd based coating composition (AC) may preferably comprise from 0.005 wt. % to 10 wt % of the at least one additional drier (AD) and more preferably from 0.1 wt. % to 5 wt % compared to the total weight of the autoxidizable alkyd based coating composition (AC).

According to one embodiment, the autoxidizable alkyd based coating composition (AC) only comprises, as a drier, the drier composition (DC) according to the invention and does not comprise any other drier or siccative.

The autoxidizable alkyd based coating composition (AC) can be used or formulated as a varnish, lacquer, paint, stain, enamel, printing ink or floor covering and similar compositions which contain autoxidizable alkyd binders (AB).

The autoxidizable alkyd based coating composition (AC) may be applied to various substrates including wood, cardboard, textiles, paper, foam, synthetic materials, leather, textiles, glass, plasters, ceramic, metals, mineral substrates, concrete, cement, brick and the like.

The present invention also refers to the preparation process of an autoxidizable alkyd based coating composition (AC) which comprises the step of:

admixing the drier composition (DC) with at least one autoxidizable alkyd binder (AB), wherein the at least one autoxidizable alkyd binder (AB) does not comprise the at least one non-ionic emulsifier (E) before being admixed with drier composition (DC). The at least one non-ionic emulsifier (E) can be at least one reaction product of at least one alkylene oxide and at least one compound (C) selected from the group consisting of: $C_6$ to $C_{14}$ alkyl phenols, $C_8$ to $C_{25}$ fatty alcohols, branched primary alcohols, $C_8$ to $C_{25}$ fatty acids, $C_8$ to $C_{25}$ fatty amines and any mixtures thereof and/or at least one alkoxylated resin (B).

The present invention also refers to a substrate which is coated with the autoxidizable alkyd based coating composition (AC).

The present invention also refers to the use of a drier composition (DC) according to the invention for drying autoxidizable alkyd based coating compositions (AC).

It is to be noted that all previously mentioned embodiments may be combined where useful or desirable.

The following examples are provided for illustration purposes and should not be construed to limit the invention.

EXAMPLES

Experimental Methods

The following tests have been performed in order to assess the properties of the tested coatings.

Hardness Measurement:

Hardness was determined according to the pendulum method of König, as laid down in DIN EN ISO 1522. Vibration damping is usually measured in seconds (s). Hardness was determined on film having a wet thickness of 150 μm on glass plates.

Colour Assessment:

Colour of the cured clearcoat films was determined using a colourimeter "Spectro-guide" (Byk Gardner GmbH). Coating films with a wet film thickness of 150 μm were applied to glass plates, and colour was measured after 7 days. A high value of "b" according to the CIE L*a*b* system indicates strong yellowing (discolouration) of the coating film.

Gloss Measurement:

Coating films with a wet film thickness of 150 μm were applied to glass plates, and gloss was measured after 7 days. Gloss was measured according to DIN 67530 with a reflectometer type micro-TRI-gloss (BYK-Gardner).

Skinning Measurement:

Formulations have been prepared according to table 10 and 25 ml filled into sealable glass bottles of a volume of 50 mL and stored at 23° C. The tung oil added to these formulations is accelerating skin formation due to its high amount of conjugated double bonds and resulting oxidative drying capacity. This test shows the tendency for skin formation of a certain formulation after shorter time. The skin formation after 1, 2, 4, 7 and 10 days was rated by following scheme:

| | |
|---|---|
| 1 | no skin formation |
| 2 | slight skin formation from the glass wall |
| 3 | <0.5 mm skinning on whole surface area |
| 4 | 0.5-1 mm skin |
| 5 | >1 mm skin |

Corrosion Test (Salt Spray Test):

The formulations of table 2 have been casted onto untreated steel ("Gardobond OC") at a wet film thickness of 250 μm and cured at 23° C. and 50% relative humidity for 7 days. The corrosion test was conducted according to EN ISO 9227 (NSS Test), each sample having been tested with central scratch. Creep distance from scratch and blistering has been evaluated.

Drying Time Measurement:

Drying time was determined using a BK 3 speed Drying Recorder sold by TQC GmbH, at 23° C. and a relative humidity of 50%. Films of the coating compositions (with a wet film thickness of 150 μm for the water-borne formulations and 75 μm for the solvent based formulations) were applied to a rectangular glass plate which was then placed horizontally on the measuring bed, whereafter a blunt needle oriented in vertical direction with a load of 5 g was positioned at one end of the glass plate and drawn through the freshly applied coating film parallel to the long axis of the rectangular glass plate during the drying process. Three phases were distinguished, where in phase a), the coating composition levels after the needle has passed, leaving a slight indentation in the levelled surface, in phase b), a groove becomes visible in the path of the needle, while the coating composition starts to cure, and in phase c), the film is not pushed aside anymore by the passing needle which indicates surface drying. Maximum drying time recorded was depending on the coating system either 12 or 24 hours.

List of the Products Used:

Mn-neodecanoate: Solution of manganese neodecanoate in white-spirit (manganese metal content of 8%).

Polyethylene glycol monooleate (8 EO): Polyethylene glycol monooleate with eight ethylene oxide units (HLB appr. 11), identified as EMU1 in the following examples.

Resydrol® AY 6150w/45WA (commercially available from Alinex): Air-drying, acrylic modified alkyd resin emulsion 45% in water (containing also <1% n-butoxy propanol).

Additol® VXW 4940N (commercially available from Allnex): mixed metal drier with 3% cobalt, 5% zirconium and 3% barium in emulsion form (containing emulsifiers).

Additol® VXL 4930 (commercially available from Allnex): silicone based leveling additive (40% active content in 2-Ethylhexanol).

Kronos® 2190 (commercially available from Kronos International): $TiO_2$ based pigment.

Kronos® 2065 commercially available from Kronos International): TiO2 based pigment.

Nubirox 102 (commercially available from Nubiola): Organophilized Zinc Phosphate-Molybdate based anticorrosive pigment.

Blanc Fixe micro: barium sulfate based filler.

Octa-Soligen® Calcium 4: 4%-wt. metal content.

Octa-Soligen® Zirconium 24: 24%-wt. metal content.

Additol® VXW 6387 (commercially available from Allnex): antisettling agent (60% active content in methoxypropanol).

Additol® VXW 6208 (commercially available from Allnex): polymeric nonionic dispersing additive.

Additol® XW 376 (commercially available from Allnex): mineral oil based defoamer emulsion.

Shellsoll™ D60: consists of $C_{10}$-$C_{12}$ paraffins and naphthenes.

Acrysol™ RM 6000 (commercially available from Dow Coating materials): non-ionic urethane rheology modifier.

Vialkyd® AS 673/60SD60 (commercially available from Allnex): Long oil, drying alkyd resin, medium viscosity, 64% oil length (soya oil type), 60% solid resin in white spirit.

Cobalt 10% in WS: Cobalt-octoate in white spirit (10% cobalt metal content).

Tung oil: iodine number of 170 (g per 100 g oil).

Borchi® Oxy Coat: iron complex drier (commercially available from OMG Borchers).

TMTACN: 1,4,7-Trimethyl-1,4,7-triazacyclononane commercially available from Sigma Aldrich.

2,2'Bipyridyl: commercially available from Sigma Aldrich, identified as Co-ligand 1 (CL-1) in the following examples.

Methylethylketoxim commercially available from Sigma Aldrich.

AMP90: 90% 2-Amino-2-methyl-1-propanol commercially available from Angus Chemical Company.

TACT: Tris-alkoxy carbamoyl triazine identified as Co-ligand 2 (CL-2) in the following examples.

Preparation of an Alkoxylated Resin (B), Identified as EMU2 in the Following Examples:

An adduct was prepared by reacting 929 g of monomethoxy polyethylene glycol having a molar mass of 2000 g/mol with 71 g of tetrahydrophthalic anhydride in the presence of 1 g triethylamine as catalyst to 150° C. until a constant acid number of 26.5 mg/g was reached. After cooling, 644 g of this adduct were mixed with 409 g of an alkyd resin having a hydroxyl number of 70 mg/g and an acid number of less than 3 mg/g made from 160 g sunflower oil, 72 g of benzoic acid as chain stopper, 100 g of phthalic anhydride and 100 g of pentaerythritol. Xylene was added thereto in the amount of 10% of the mass of the resin mixture, the resulting mixture was heated to 220° C. and water was completely separated, whereafter the xylene was distilled off. The remaining product had an acid number of less than 2.5 mg/g.

Preparation of a Co-Ligand (CL) which is Tris-Alkoxy Carbamoyl Triazine (TACT), Identified as Co-Ligand 2 (CL-2) in the Following Examples:

10 g of the vacuum stripped product obtained from the reaction of melamine with oxalyl chloride in dioxane was short path distilled at high vacuum to remove a small amount of polymerized dioxane. 7.67 g of a light yellow clear oil was obtained which slowly solidified. At room temperature, 30 grams of this product was added to 30 g of n-butanol upon which an exotherm was noticed. The resulting hazy solution was filtered and adjusted to a solids content of 50% with further n-butanol. The IR showed complete disappearance of a strong urethane band at 1750 cm-1.

Preparation of the Drier Compositions (DC):

The components of table 1 have been dosed into sealable glass bottles in the given sequence and stirred for 1 hour at 40° C. All drier compositions (DC), except examples 10 and 11, have been chosen such as to represent 1 wt. % of manganese. Drier compositions (DC) of example 10 represents 6.4 wt. % of manganese and example 11 represents 3.2 wt. % of manganese.

TABLE 1

| Experimental Product | 1 | 2 | 3 | 4 | 5 | 6 | 7 | 8 | 9 | 10 | 11 |
|---|---|---|---|---|---|---|---|---|---|---|---|
| Metal salt (MS): Mn-neodecanoate (8%) (grams) | 12.5 | 12.5 | 12.5 | 12.5 | 12.5 | 12.5 | 12.5 | 12.5 | 12.5 | 12.5 | 12.5 |
| Ligand: 1,4,7-Trimethyl-1,4,7-triazacyclononane (grams) | 3.11 | 6.22 | 3.11 | 3.11 | 6.22 | 3.11 | 3.11 | 3.11 | 3.11 | 3.11 | 3.11 |
| Co-ligand 1: CL-1 2,2'Bipyridyl (grams) | | | 2.84 | | | 2.84 | | | | | |
| Co-Liaand 2: CL-2 TACT (grams) | | | | | | | | 15.3 | 15.3 | | 15.3 |
| Non-ionic emulsifier (E): EMU1 Polyethylene glycol monooleate (8 EO) (grams) | | | | 84.39 | 81.28 | 81.55 | 69.09 | | | | |
| Non-ionic emulsifier (E): EMU2 alkoxylated resin (B) | | | | | | | | | | 84.39 | 69.09 |

TABLE 1-continued

| Experimental Product | 1 | 2 | 3 | 4 | 5 | 6 | 7 | 8 | 9 | 10 | 11 |
|---|---|---|---|---|---|---|---|---|---|---|---|
| Solvent: Shellsol ™ D 60 (grams) | 84.39 | 81.28 | 81.55 | | | | | | | | |
| Total | 100 | 100 | 100 | 100 | 100 | 100 | 100 | 100 | 100 | 15.61 | 30.91 |

Amounts of components are indicated in grams.

Experimental products 4, 5, 6, 7, 8, and 9 are examples according to the invention.

Experimental product 6 further comprises 2,2 bipyridyl in addition to TMTACN and Mn salt.

Experimental products 1, 2, 3, 10 and 11 are comparative examples.

Examples 10 and 11 do not comprise solvent and non-ionic emulsifier (E).

Formulations of Water-Borne Direct-to-Metal Coating

The components of table 2 (except deionized water and Acrysol® RM 6000) have been pre-blended in the given sequence in a steel pot and then dispersed on a bead mill equipped with 2 mm glass beads until reaching a fineness of 10 μm (determined by grindometer). Then the mill-base has been completed by adding deionized water and rheology modifier (Acrysol® RM 6000) to adjust the viscosity to 1000 mPas.

Cobalt based mixed metal drier has been applied at a cobalt level (based on solid autoxidizable alkyd binder (AB)) of 500 ppm. Iron drier (Borchi® Oxycoat from OMG Borchers) has been applied as recommended from the supplier (equal amount like a 10% cobalt based drier). Manganese based driers have been applied at a level of 50 ppm of manganese metal on solid autoxidizable alkyd binder (AB).

TABLE 2

| Formulation | 12 | 13 | 14 | 15 | 16 |
|---|---|---|---|---|---|
| Resydrol® AY 6150w/45WA | 66.10 | 66.10 | 66.10 | 66.10 | 66.10 |
| Ammonia 25% in water | 0.30 | 0.30 | 0.30 | 0.30 | 0.30 |
| AMP 90 | 0.10 | 0.10 | 0.10 | 0.10 | 0.10 |
| Additol® VXW 4940N | 0.50 | | | | |
| Experimental product 1 | | 0.15 | | | |
| Experimental product 4 | | | 0.15 | | |
| Experimental product 6 | | | | 0.15 | |
| Borchi® Oxy Coat | | | | | 0.15 |
| Methylethylketoxime | 0.30 | 0.30 | 0.30 | 0.30 | 0.30 |
| Additol® VXL 4930 | 0.70 | 0.70 | 0.70 | 0.70 | 0.70 |
| Kronos® 2190 | 18.20 | 18.20 | 18.20 | 18.20 | 18.20 |
| Nubirox 102 | 2.90 | 2.90 | 2.90 | 2.90 | 2.90 |
| Blanc Fixe micro | 1.90 | 1.90 | 1.90 | 1.90 | 1.90 |
| Additol® VXW 6387 | 0.50 | 0.50 | 0.50 | 0.50 | 0.50 |
| Additol® VXW 6208 | 0.70 | 0.70 | 0.70 | 0.70 | 0.70 |
| Additol® XW 376 | 0.40 | 0.40 | 0.40 | 0.40 | 0.40 |
| Deionized water | 5.90 | 6.25 | 6.25 | 6.25 | 6.25 |
| Acrysol ™ RM 6000 | 1.50 | 1.50 | 1.50 | 1.50 | 1.50 |
| TOTAL | 100.00 | 100.00 | 100.00 | 100.00 | 100.00 |

Formulations 14 and 15 are formulations according to the invention.

Formulations 12, 13 and 16 are comparative formulations.

Amounts of components are indicated in grams.

Application Tests of Water-Borne Direct-to-Metal Coating

The formulations from table 2 have been applied to glass or steel panels at a wet film thickness of 150 μm either after 4 days of storage at 23° C. or after 4 days of storage at 60° C. (as an accelerated storage test). Tables 3 to 7 are showing the application data of the obtained coatings.

TABLE 3

| Drying performance | Formulation | | | | |
|---|---|---|---|---|---|
| (phase c) | 12 | 13 | 14 | 15 | 16 |
| Drying time 4 days at 23° C. in hours | 11 | 11 | 7.5 | 6.5 | 8.5 |
| Drying time 4 days at 60° C. in hours | 10.5 | 7.5 | 5 | 6 | 5 |

Formulations 14 and 15 show very good drying performance. The drying time of both formulations at 23° C. is significantly lower than those of formulations 12, 13 and 16. At 60° C., the drying time of formulations 14 and 15 is still better to the one obtained with formulations 12 and 13 and is comparable to the one obtained with formulation 16 which contains Borchi® Oxy Coat as a drier.

TABLE 4

| | Formulation | | | | |
|---|---|---|---|---|---|
| Gloss retention | 12 | 13 | 14 | 15 | 16 |
| Gloss 20° 4 days at 23° C. | 41 | 39 | 46 | 42 | 36 |
| Gloss 20° 4 days at 60° C. | 45 | 47 | 47 | 47 | 41 |

Formulations 14 and 15 show a better gloss retention that formulations 12 and 16 and a gloss retention comparable to formulation 13.

TABLE 5

| | Formulation | | | | |
|---|---|---|---|---|---|
| Yellowing | 12 | 13 | 14 | 15 | 16 |
| Color 4 days 23° C.[b-value] | 2.31 | 1.61 | 1.13 | 1.05 | 2.25 |
| Color 4 days 60° C.[b-value] | 2.67 | 2.09 | 1.8 | 1.62 | 2.69 |

Formulations 14 and 15 show the best performances in terms of yellowing. In particular, formulation 15 which contains 2,2'bipyridil as a co-ligand (CL) and polyethylene glycol monooleate as a non-ionic emulsifier (E) has the lowest yellowing.

TABLE 6

| | Formulation | | | | |
|---|---|---|---|---|---|
| Pendulum hardness | 12 | 13 | 14 | 15 | 16 |
| 2 days [sec.] | 16 | 9 | 11 | 12 | 14 |
| 4 days [sec.] | 22 | 13 | 15 | 18 | 18 |
| 7 days [sec.] | 27 | 16 | 19 | 22 | 16 |

Formulations 14 and 15 show a very good hardness. Furthermore, it has to be highlighted that a better hardness is obtained with formulations 14 and 15 compared to formulations 13 and 16 whereas it would have been expected that the presence of a non-ionic emulsifier (E) would render the resulting coatings softer. The cobalt based formulation 12 is still performing best in hardness development, however out of the selection of cobalt-free driers formulation 14 and 15 (according to the invention) are performing best.

TABLE 7

| | Formulation | | | | |
|---|---|---|---|---|---|
| Salt spray test 336 hrs. | 12 | 13 | 14 | 15 | 16 |
| Blister [size/amount] | 0/0 | 0/0 | 0/0 | 0/0 | 3/1 |
| Corrosion creep [mm] | 8 | 7 | 7 | 7 | 10 |

Salt spray test has been started after 7 days of cure at 23° C. and 50% relative humidity.

Formulations 14 and 15 show both excellent property of corrosion resistance. In particular, the results obtained with formulations 14 and 15 are superior to those obtained with the coating prepared with formulation 16. This shows that the presence of non-ionic emulsifier (E) has no negative impact on the corrosion of the resulting coating.

Formulations of Solvent-Borne Clearcoats

The ingredients of table 8 have been blended in the given sequence with a lab blender and stored either 4 days at 23° C. or 4 days at 60° C. (as an accelerated storage test).

TABLE 8

| Formulation | 17 | 18 | 19 | 20 | 21 | 22 | 23 |
|---|---|---|---|---|---|---|---|
| VIALKYD ® AS 673/60SD60 | 83.33 | 83.33 | 83.33 | 83.33 | 83.33 | 83.33 | 83.33 |
| Cobalt 10% in WS | 0.25 | | | | | | |
| Experimental product 1 | | 0.25 | | | | | |
| Experimental product 2 | | | 0.25 | | | | |
| Experimental product 3 | | | | 0.25 | | | |
| Experimental product 4 | | | | | 0.25 | | |
| Experimental product 5 | | | | | | 0.25 | |
| Experimental product 6 | | | | | | | 0.25 |
| Methylethylketoxim | 0.3 | 0.3 | 0.3 | 0.3 | 0.3 | 0.3 | 0.3 |
| White spirit | 16.12 | 16.12 | 16.12 | 16.12 | 16.12 | 16.12 | 16.12 |
| Total | 100.00 | 100.00 | 100.00 | 100.00 | 100.00 | 100.00 | 100.00 |

Amounts of components are indicated in grams.
Formulations 21-23 are formulations according to the invention.
Formulations 17-20 are comparative formulations.

TABLE 9

| Drying performance | Formulation | | | | | | |
|---|---|---|---|---|---|---|---|
| (phase c) | 17 | 18 | 19 | 20 | 21 | 22 | 23 |
| Drying time 4 days in hours | 4.5 | 5.5 | 4 | 6 | 4.5 | 3.5 | 4 |

Formulations 21-23 show excellent drying performance.

Skinning Test with Solvent-Borne Clearcoats

Formulations have been prepared according to table 10 and 25 mL filled into sealable glass bottles of a volume of 50 mL and stored at 23° C. The tung oil added to these formulations is accelerating skin formation due to its high amount of conjugated double bonds and resulting oxidative drying capacity. This test shows the tendency for skin formation of a certain formulation after shorter time.

TABLE 10

| Formulation | 24 | 25 | 26 | 27 | 28 | 29 | 30 |
|---|---|---|---|---|---|---|---|
| VIALKYD ® AS 673/60SD60 | 75.00 | 75.00 | 75.00 | 75.00 | 75.00 | 75.00 | 75.00 |
| Tung oil | 5.00 | 5.00 | 5.00 | 5.00 | 5.00 | 5.00 | 5.00 |
| Cobalt 10% in WS | 0.25 | | | | | | |
| Experimental product 1 | | 0.25 | | | | | |
| Experimental product 2 | | | 0.25 | | | | |
| Experimental product 3 | | | | 0.25 | | | |
| Experimental product 4 | | | | | 0.25 | | |
| Experimental product 5 | | | | | | 0.25 | |

TABLE 10-continued

| Formulation | 24 | 25 | 26 | 27 | 28 | 29 | 30 |
|---|---|---|---|---|---|---|---|
| Experimental product 6 | | | | | | | 0.25 |
| Methylethylketoxim | 0.3 | 0.3 | 0.3 | 0.3 | 0.3 | 0.3 | 0.3 |
| White spirit | 19.45 | 19.45 | 19.45 | 19.45 | 19.45 | 19.45 | 19.45 |
| Total | 100.00 | 100.00 | 100.00 | 100.00 | 100.00 | 100.00 | 100.00 |

Amounts of components are indicated in grams.
Formulations 24-27 are comparative formulations.
Formulations 28-30 are formulations according to the invention.

The skin formation after 1, 2, 4, 7 and 10 days was rated by following scheme and is illustrated in table 11:

| 1 | no skin formation |
|---|---|
| 2 | slight skin formation from the glass wall |
| 3 | <0.5 mm skinning on whole surface area |
| 4 | 0.5-1 mm skin |
| 5 | >1 mm skin |

TABLE 11

| | Formulation | | | | | | |
|---|---|---|---|---|---|---|---|
| Skin formation | 24 | 25 | 26 | 27 | 28 | 29 | 30 |
| 1 day (at 23° C.) | 1 | 1 | 1 | 1 | 1 | 1 | 1 |
| 2 days (at 23° C.) | 1 | 1 | 1.5 | 1 | 1 | 1.5 | 1 |
| 4 days (at 23° C.) | 1 | 2 | 2 | 1 | 1 | 2 | 1 |
| 7 days (at 23° C.) | 1 | 2 | 4 | 1.5 | 2 | 3 | 1 |
| 10 days (at 23° C.) | 1 | 3 | 5 | 2 | 3 | 3 | 1 |

The results show that the formulations according to the present invention display low skinning tendency. The addition of non-ionic emulsifier (E) allows accelerating the drying speed while maintaining a low skinning tendency. Furthermore, formulation 30 which contains 2,2'bipyridyl shows an even lower skinning tendency. The cobalt based formulation 24 doesn't show a tendency to form a skin. Formulation 24 comprises Cobalt. Formulations 25 to 27 do not contain non-ionic emulsifier (E) and formulations 28 to 30 are the corresponding formulations containing non-ionic emulsifier (E). The skinning tendency is lower if non-ionic emulsifier (E) is contained and formulation 30 impressively shows that a compromise of high curing speed (formulation 23, table 9) and low skin formation tendency can be achieved. Formulation 27 also has a low tendency to form a skin, however the curing speed (formulation 20 in table 9) is low too. Formulation 25 and 28 show similar behavior in terms of skin formation however curing speed is lower if no emulsifier is involved (compare formulations 18 and 21 from table 9).

Influence of Emulsifier in Waterbased Direct-to-Metal Coating

TABLE 12

| Formulation | 31 | 32 | 33 | 34 |
|---|---|---|---|---|
| Part I | | | | |
| RESYDROL ® AY 6150w/45WA | 66.10 | 66.10 | 66.10 | 66.10 |
| Ammonia 25% in water | 0.30 | 0.30 | 0.30 | 0.30 |
| AMP 90 | 0.10 | 0.10 | 0.10 | 0.10 |

TABLE 12-continued

| Formulation | 31 | 32 | 33 | 34 |
|---|---|---|---|---|
| Methylethylketoxime | 0.30 | 0.30 | 0.30 | 0.30 |
| Additol ® VXL 4930 | 0.70 | 0.70 | 0.70 | 0.70 |
| Kronos ® 2190 | 18.20 | 18.20 | 18.20 | 18.20 |
| Nubirox 102 | 2.90 | 2.90 | 2.90 | 2.90 |
| Blanc Fixe micro | 1.90 | 1.90 | 1.90 | 1.90 |
| ADDITIOL ® VXW 6387 | 0.50 | 0.50 | 0.50 | 0.50 |
| ADDITIOL ® VXW 6208 | 0.70 | 0.70 | 0.70 | 0.70 |
| ADDITIOL ® XW 376 | 0.40 | 0.40 | 0.40 | 0.40 |
| Deionized water | 5.90 | 6.25 | 6.25 | 6.25 |
| Acrysol ® RM 6000 | 1.50 | 1.50 | 1.50 | 1.50 |
| Part II | | | | |
| EMU 1: Polyethylene glycol monooleate (8 EO) | | | 0.127 | 0.104 |
| Experimental Product 4 | 0.15 | | | |
| Experimental Product 7 | | 0.15 | | |
| Experimental Product 10 | | | 0.023 | |
| Experimental Product 11 | | | | 0.046 |
| Drying Performance (phase c) | | | | |
| 4 days room temperature [hrs.] | 10.5 | 12 | 14 | 16 |
| 4 days 60° C. [hrs.] | 16 | 10 | 24 | 21 |

The components of Part I of table 12 (except deionized water and Acrysol® RM 6000) have been pre-blended in the given sequence in a steel pot and then dispersed on a bead mill equipped with 2 mm glass beads until reaching a fineness of 10 μm (determined by grindometer). Then, the mill-base has been completed by adding deionized water and rheology modifier (Acrysol RM 6000) to adjust the viscosity to 1000 mPas.

Components of Part II were blended in (in the given sequence) by a lab blender. After addition of EMU1:Polyethylene glycol monooleate (8 EO) the formulation was stored for 24 hours before further components were blended in.

Experimental products 10 and 11 used in formulations 33 and 34 do not comprise any non-ionic emulsifier EMU 1. In formulations 33 and 34, the emulsifier is introduced before the addition of the Manganese complex. Both experimental products 4 and 7 comprise the non-ionic emulsifier EMU 1.

When preparing formulations 33 and 34, Part I is first mixed with the non-ionic emulsifier EMU1, then the resulting mixture is stored for 24 hours and in a subsequent step, experimental products 10 and 11 which comprise the Manganese complex and the co-ligand (for experimental product 11) are blended with Part I.

Better drying performances are measured for formulations 31 and 32 than for formulations 33 and 34.

This shows that improved results are obtained for formulations 31 and 32 wherein the Manganese complex (MC) is introduced together with the non-ionic emulsifier (E) compared to formulations 33 and 34 wherein the non-ionic emulsifier (E) is present in the formulation before the introduction of the Manganese complex (MC).

Formulation of Solvent Based White Topcoat.

TABLE 13

| PART I | |
|---|---|
| Vialkyd ® AS673/60SD60 | 620.1 |
| Kronos ® 2065 | 297.9 |
| PART II | |
| Calcium octoate 4 | 18.6 |
| Zirconium octoate 24 | 4.7 |
| Additol ® VXL 4930 | 2 |
| White spirit | 49.3 |
| Methylethylketoxim | 7.4 |
| Total in grams | 1000 |

The components of Part I of table 13 have been pre-blended in the given sequence in a steel pot and then dispersed on a bead mill equipped with 2 mm glass beads until reaching a fineness of 10 µm (determined by grindometer). Then the mill-base has been completed by adding the residual components from table 13. To that formulation the corresponding amounts (given by table 14) of different driers have been blended in by use of a lab blender.

Drying Performance of the Drier Composition in Formulation of Solvent Based White Topcoat.

TABLE 14

| Formulation | 35 | 36 | 37 | 38 | 39 | 40 |
|---|---|---|---|---|---|---|
| Solvent based white topcoat of Table 13 | 50 | 50 | 50 | 50 | 50 | 50 |
| Experimental product 4 | | | 0.22 | | | |
| Experimental product 7 | | | | 0.22 | | |
| Experimental product 1 | 0.22 | | | | | |
| Borchi OXY-coat | | 0.22 | | | | |
| Experimental product 8 | | | | | 0.22 | |
| Experimental product 9 | | | | | | 0.22 |
| Total | 50.22 | 50.22 | 50.22 | 50.22 | 50.22 | 50.22 |
| Drying Performance (phase c) | | | | | | |
| 4 days 60° C. [hrs.] | 5 | 6.5 | 3 | 3 | 3.5 | 2.5 |

Formulations 35 and 36 are not according to the invention.

Formulations 37 to 40 are according to the invention.

Formulations 37 to 40 show better drying performance than formulations 35 and 36 after storage of the formulations for 4 days at 60° C. This demonstrates the good drying performance of the inventive drier compositions on storage of the alkyd formulation. This is an important aspect since alkyd formulations should show stable drying performance even if stored for several months. This advantage of the drier compositions (DC) according to the invention in combination with the low tendency to form a skin (demonstrated in table 11) is a big benefit for commercial alkyd paint formulations.

The invention claimed is:

1. A drier composition for an autoxidizable alkyd coating composition comprising:
   (a) at least one metal complex comprising:
      at least one metal salt comprising
         at least one metal cation that is manganese, and
         at least one anion and
      at least one nitrogen donor ligand that is selected from the group comprising monodentate, bidentate, tridentate, pentadentate, and hexadentate nitrogen donor ligands, and
   (b) at least one non-ionic emulsifier.

2. The drier composition according to claim 1, wherein the at least one non-ionic emulsifier is an alkoxylated compound.

3. The drier composition according to claim 1, wherein the at least one non-ionic emulsifier is the reaction product of at least one alkylene oxide and at least one compound selected from the group consisting of: $C_6$ to $C_{14}$ alkyl phenols, $C_8$ to $C_{25}$ fatty alcohols, branched primary alcohols, $C_8$ to $C_{25}$ fatty acids, $C_8$ to $C_{25}$ fatty amines and any mixtures thereof.

4. The drier composition according to claim 1, wherein the non-ionic emulsifier is an alkoxylated resin.

5. The drier composition according to claim 4, wherein the alkoxylated resin is a condensation product of:
   an alkyd resin and
   an adduct of:
      a hydroxyl group containing monoalkyl ether selected from the group consisting of:
         C1- to C4-monoalkyl ethers of a polyoxyethylene glycol; and
         C1- to C4-monoalkyl ethers of a mixed ether of ethylene and propylene glycol, and any mixtures thereof,
      and an anhydride of a cycloaliphatic dicarboxylic acid.

6. The drier composition according to claim 1, further comprising a co-ligand that is 2,2'bipyridyl and/or a tricarbamoyl triazine compound.

7. The drier composition according to claim 1, wherein the at least one nitrogen donor ligand is selected from the group consisting of the compounds of formula (III) and (IV):

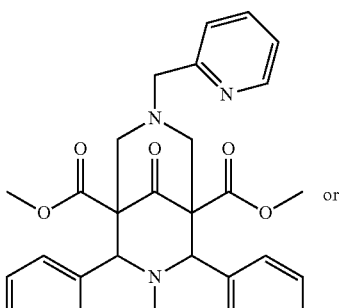

(III)

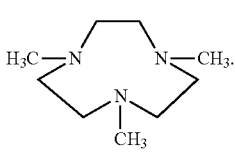

(IV)

8. The drier composition according to claim 1, wherein the at least one anion is selected from the group consisting of: halides, nitrates, sulphates, carboxylates, $PF_6^-$, $SbF_6^-$, $AsF_6^-$, $BF_4^-$, $B(C_6F_5)_4^-$, $Cl^-$, $Br^-$, $I^-$, $NO_3^-$, and $RCOO^-$, wherein R is $C_1$-$C_{20}$ alkyl.

9. The drier composition according to claim 1, wherein the at least one metal cation is manganese, the at least one nitrogen donor ligand is of formula (IV):

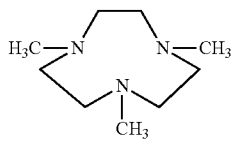

(IV)

and the at least one non-ionic emulsifier is an oleic acid ethoxylate with from 6 to 8 ethylene oxide units and/or an alkoxylated resin that is the reaction product of:
at least one polyol,
at least one polybasic acid,
at least one fatty acid,
at least one monobasic acid,
at least one hydroxyl group-containing monoalkyl ether, and
at least one anhydride of a cycloaliphatic dicarboxylic acid, and
and optionally comprises a co-ligand.

10. The drier composition according to claim 1, wherein the anion is a neodecanoate.

11. The drier composition according to claim 1, which further comprises at least one solvent.

12. The drier composition according to claim 1, wherein the molar ratio between the at least one metal cation and the at least one nitrogen donor ligand is comprised within the range of from 0.05 to 20.

13. An autoxidizable alkyd coating composition comprising:

1) the drier composition according to claims 1, and
2) at least one autoxidizable alkyd binder.

14. A varnish, lacquer, paint, stain, enamel, printing ink or floor covering comprising the autoxidizable alkyd coating composition according to claim 13.

15. A substrate which is coated with an autoxidizable alkyd coating composition according to claim 13.

16. A method of drying at least one autoxidizable alkyd coating composition comprising applying a drier composition according to claim 1.

17. A method of preparing a drier composition comprising admixing
(a) at least one metal complex comprising
at least one metal salt comprising
at least one metal cation that is manganese, and
at least one anion, and
at least one nitrogen donor ligand that is selected from the group comprising monodentate, bidentate, tridentate, pentadentate, and hexadentate nitrogen donor ligands, and
(b) at least one non-ionic emulsifier.

18. A method of preparing an autoxidizable alkyd based coating composition comprising admixing a drier composition with at least one autoxidizable alkyd binder,
wherein the at least one autoxidizable alkyd binder does not comprise the at least one non-ionic emulsifier before being admixed with drier composition, and
wherein the drier composition comprises:
(a) at least one metal complex comprising:
at least one metal salt comprising
at least one metal cation that is manganese, and
at least one anion and
at least one nitrogen donor ligand that is selected from the group comprising monodentate, bidentate, tridentate, pentadentate, and hexadentate nitrogen donor ligands, and
(b) at least one non-ionic emulsifier.

* * * * *